(12) United States Patent
Arissian et al.

(10) Patent No.: US 8,446,592 B1
(45) Date of Patent: May 21, 2013

(54) SCANNING PHASE INTRACAVITY NANOSCOPE

(75) Inventors: Ladan Arissian, Albuquerque, NM (US); Jean-Claude Diels, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 879 days.

(21) Appl. No.: 12/535,509

(22) Filed: Aug. 4, 2009

Related U.S. Application Data

(60) Provisional application No. 61/137,893, filed on Aug. 4, 2008.

(51) Int. Cl.
*G01B 9/02* (2006.01)
*G01B 11/02* (2006.01)

(52) U.S. Cl.
USPC .......................................... 356/484; 356/496

(58) Field of Classification Search
USPC ................. 356/484, 485, 486, 496, 497, 498, 356/432–436; 977/868, 880, 881
See application file for complete search history.

(56) References Cited

U.S. PATENT DOCUMENTS

| | | |
|---|---|---|
| 6,650,682 B1 | 11/2003 | Diels et al. |
| 7,583,715 B2 | 9/2009 | Hill et al. |
| 7,617,081 B2 | 11/2009 | Von Winckel et al. |
| 7,659,536 B2 | 2/2010 | Krishna et al. |
| 7,664,149 B2 | 2/2010 | Diels et al. |
| 2005/0211873 A1 | 9/2005 | Krishna |
| 2008/0006816 A1 | 1/2008 | Krishna et al. |

OTHER PUBLICATIONS

Zavadilova et al., Intracavity pumped picosecond Optical Parametric Oscillator for intracavity interferometry, Optical Society of America, 2006).*
Alford, W. J, et al., "High power and good beam quality at 980 nm from a vertical external-cavity surface-emitting laser", J. Opt. Soc. Am. B, 19(4), (2002), 663-666.
Arissian, L, "Stabilization of mode-locked lasers, and dark resonance of two-photon lambda-level structures", Journal of Modern Optics, 49, (2002), 2517-2533.
Arissian, L., et al., "Multiple quantum wells for ring and linear lasers with long lifetime gain", Solid State Lasers XIV: Technology and Devices, Proceedings of the SPIE, vol. 5707, (2005), 295-301.
Arissian, Ladan, et al., "Mode-locked laser as a combined radio-frequency and optical clock, stabilized to a reference cavity, and calibrated through coherent interaction with rubidium", Applications of Photonic Technology 6., Proceedings of the SPIE, vol. 5260, (2003), 217-225.
Arissian, Ladan, et al., "Mode-locked lasers applied to coherent interactions and phase measurements", Journal of Modern Optics, 53(16-17), (2006), 2593-2603.
Betzig, E., et al., "Imaging Intracellular Fluorescent Proteins at Nanometer Resolution", Science, 313, (2006), 1642-1645.

(Continued)

*Primary Examiner* — Gregory J Toatley
*Assistant Examiner* — Dominic J Bologna
(74) *Attorney, Agent, or Firm* — Schwegman Lundberg & Woessner, P.A.

(57) ABSTRACT

A Scanning Phase Intracavity Nanoscope as a measurement system can be realized with a reference laser cavity and a sample laser cavity superimposed upon each other to operatively propagate two laser beams. The sample laser cavity is operatively formed by the sample to be measured. A measurement of the sample is based on differences in the reference laser cavity and the sample laser cavity determined from difference in the two laser beams.

20 Claims, 19 Drawing Sheets

OTHER PUBLICATIONS

Bohn, M, et al., "Optimizing the frequency in dithered laser gyroscopes", Optics Communications, 213(4-6), (Dec. 2002), 331-7.

Bohn, Matthew J, et al., "Measuring intracavity phase changes by use of double pulses in a linear cavity", Optics Letters, 22(9), (1997), 642-44.

Bozhevolnyi, Sergey I, et al., "Polarization-resolved imaging with a reflection near-field optical microscope", J. Opt. Soc. Am. A, 16(11), (Nov. 1999), 2649-2657.

Burns, A. R, et al., "Local mobility in lipid domains of supported bilayers characterized by atomic force microscopy and fluorescence correlation spectroscopy", Biophys J., 89(2), (Aug. 2005), 1081-93.

Chazal, N., et al., "Virus entry, assembly, budding, and membrane rafts", Microbiol Mol Biol Rev., 67(2), (Jun. 2003), 226-37.

Chen, X., et al., "Cholesterol depletion from the plasma membrane triggers ligand-independent activation of the epidermal growth factor receptor", J Biol Chem., 277(51), (Dec. 20, 2002), 49631-7.

Chen, Zhigang, et al., "Highly efficient optical coupling and transport phenomena in chains of dielectric microspheres", Optics Letters, 31(3), (Feb. 1, 2006), 389-391.

Dennis, Michael L, et al., "Femtosecond ring dye laser: a potential new laser gyro", Optics Letters, 16(7), (Apr. 1991), 529-531.

Diddams, S. A, et al., "Dispersion measurements with white-light interferometry", J. Opt. Soc. Am. B, 13(6), (Jun. 1996), 1120-1129.

Diddams, Scott, et al., "Frequency locking and unlocking in a femtosecond ring laser with application to intracavity phase measurements", Applied Physics B: Lasers & Optics (1996), 473-480.

Diels, J. C, et al., "Chapter 12: Applications of Ultrafast Lasers: Sensors of extreme sensitivity", Femtosecond Optical Frequency Comb : Principle, Operation, and Applications, New York, NY : Springer; Jun Ye and Steven Cundiff, Eds., (2005), 333-54.

Diels, Jean-Claude, "Intracavity Phase Spectroscopy, Application to a Multiple beat atomic clock, wavelength standard and motion sensor", National Science Foundation, Award Abstract #9970082, (Jul. 30, 1999), 2 pgs.

Diels, Jean-Claude, et al., "Intracavity sensors and spectroscopy with mode-locked lasers", National Science Foundation, Award Abstract #0601612, (Apr. 27, 2006), 3 pgs.

Diels, Jean-Claude, "Stabilized Lasers as Sensors and Frequency Standards", National Science Foundation, Award Abstract #0217882, (Aug. 1, 2002), 2 pgs.

Goldberg, Bennett B, et al., "Immersion Lens Microscopy of Photonic Nanostructures and Quantum Dots", IEEE Journal of Selected Topics in Quantum Electronics, 8(5), (2002), 1051-1059.

Gustafsson, M., et al., "I5M: 3D widefield light microscopy with better than 100nm axial resolution", Journal of Microscopy, 195(1), (Jul. 1999), 10-16.

Gustafsson, M., "Nonlinear structured-illumination microscopy: wide-field fluorescence imaging with theoretically unlimited resolution", Proc Natl Aced Sci U S A., 102(37), (Sep. 13, 2005), 13081-6.

Hartschuh, Achim, et al., "High-Resolution Near-Field Raman Microscopy of Single-Walled Carbon Nanotubes", Physical Review Letters, 90(9), (2003), 095503-1-095503-4.

Hell, S., et al., "Breaking the diffraction resolution limit by stimulated emission: stimulated-emission-depletion fluorescence microscopy", Optics Letters, 19(11), (Jun. 1, 1994), 780-782.

Hell, S., et al., "Fundamental improvement of resolution with a 4Pi-confocal fluorescence microscope using two-photon excitation", Optics Communications, 93, (Oct. 15, 1992), 277-282.

Hofmann, M., "Breaking the diffraction barrier in fluorescence microscopy at low light intensities by using reversibly photoswitchable proteins", Proc Natl Acad Sci U S A., 102(49), (Dec. 6, 2005), 17565-9.

Hynes, N. E, et al., "The ErbB receptor tyrosine family as signal integrators", Endocrine-Related Cancer, 8, (2001), 151-159.

Jones, R J, et al., "Stabilization of the frequency, phase and repetition rate of an ultas-short pulse train to a Fabry-Pero reference cavity", Optics Comm, 175, (2000), 409-18.

Jones, R. J, et al., "Frequency and phase stabilization of femtosecond light pulses to a Fabry-Perot reference cavity", Technical Digest Quantum Electronics and Laser Science Conference, 2000. (QELS 2000)., (2000), 110.

Jones, R. J, et al., "Stabilization of Femtosecond Lasers for Optical Frequency Metrology and Direct Optical to Radio Frequency Synthesis", Physical Review Letters, 86(15), (Apr. 9, 2001), 3288-3291.

Kubecek, V., et al., "Multiple quantum wells for mode-locking", Conference on Lasers and Electro-Optics/International Quantum Electronics Conference and Photonic Applications Systems Technologies, Technical Digest (CD) (Optical Society of America, 2004), paper CThV4, (2004), 3 pgs.

Lai, Ming, et al., "Nonreciprocal measurements in femtosecond ring lasers", Optics Letters, 17(21), (Nov. 1, 1992), 1535-1537.

Lidke, D. S, et al., "Biotin-ligand complexes with streptavidin quantum dots for in vivo cell labeling of membrane receptors", Methods Mol Biol., 374, (2007), 69-79.

Lidke, D. S, "Quantum dot ligands provide new insights into erbB/HER receptor-mediated signal transduction", Nat Biotechnol., 22(2), (Feb. 2004), 198-203.

Lidke, D. S, et al., "Reaching out for signals: filopodia sense EGF and respond by directed retrograde transport of activated receptors", J Cell Biol., 170(4), (Aug. 15, 2005), 619-26.

Meng, Xianmei, et al., "Intracavity pumped optical parametric oscillator bidirectional ring laser as a differential interferometer", Optics Communications, vol. 233(1-3), (2004), 167-172.

Metzger, H., "Transmembrane signaling: the joy of aggregation", J Immunol., 149(5), (Sep. 1, 1992), 1477-87.

Nagy, P., et al., "Lipid rafts and the local density of ErbB proteins influence the biological role of homo—and heteroassociations of ErbB2.", J Cell Sci., 115(Pt 22), (Nov. 15, 2002), 4251-62.

Navarro, M., et al., "Mode-locked ring lasers for the backscattering measurement of mirrors", Optics Letters, 31(19), (2006), 2864-2866.

Ober, R. J, et al., "Localization Accuracy in Single-Molecule Microscopy", Biophysical Journal, 86, (Feb. 2004), 1185-1200.

Orr, G., et al., "Cholesterol dictates the freedom of EGF receptors and HER2 in the plane of the membrane", Biophys J., 89(2), (Aug. 2005), 1362-73.

Park, Sung Cheol, et al., "Super-resolution image reconstruction: a technical overview", IEEE Signal Processing Magazine, 20(3), (May 2003), 21-36.

Pike, L. J, et al., "Cholesterol levels modulate EGF receptor-mediated signaling by altering receptor function and trafficking", Biochemistry, 41(32), (Aug. 13, 2002), 10315-22.

Prasad, S., "Digital superresolution and the generalized sampling theorem", J. Opt. Soc. Am. A, 24(2), (Feb. 2007), 311-325.

Prasad, S., "Focusing light into a multiple-core fiber. I. Theory", Optics Communications, 115(3-4), (Mar. 15, 1995), 354-367.

Pulaski, P., "Demonstration of a nonreciprocal multiple-quantum-well structure leading to unidirectional operation of a ring laser", Summaries of papers presented at the Conference on Lasers and Electro-Optics, 1998. CLEO 98. Technical Digest., (1998), 469.

Pulaski, Paul, et al., "Unidirectional multiple-quantum-well laser", CLEO '95 ; summaries of papers presented at the Conference on Lasers and Electro-Optics, May 22-26, 1995, Baltimore Convention Center, Baltimore, Mary, (1995), 153 (CTuQ4).

Quintero-Torres, R, et al., "Scatterometer using a bidirectional ring laser", Optics Communications, 241(1-3), (Nov. 1, 2004), 179-183.

R. Jason Jones, R. Jason, et al., "Solid-state laser gyro using ZnS for Kerr-lens mode locking", Summaries of papers presented at the Conference on Lasers and Electro-Optics, 1998. CLEO 98. Technical Digest., (1998), 434.

Raja, M., et al., "Novel wavelength-resonant optoelectronic structure and its application to surface-emitting semiconductor lasers", Electronics Letters, 24(18), (1988), 1140-1142.

Raja, M., et al., "Resonant periodic gain surface-emitting semiconductor lasers", IEEE Journal of Quantum Electronics, 25(6), (1989), 1500-1512.

Rust, M. J, et al., "Sub-diffraction-limit imaging by stochastic optical reconstruction microscopy (STORM).", Nat Methods, 3(10), (Oct. 2006), 793-5.

Schlessinger, J., "Ligand-Induced, Receptor-Mediated Dimerization and Activation of EGF Receptor", Cell, 110, (Sep. 20, 2002), 669-672.

Schmitt-Sody, A., et al., "High-Power Hybrid Mode-Locked External Cavity Semiconductor Laser Using Tapered Amplifier with Large Tunability", Research Letters in Optics, 2008, (2008), 1-5.

Schmitt-Sody, A., et al., "Ultra-Slow Dynamics of an Ultra-Fast Laser", Quantum Electronics and Laser Science Conference (QELS), (May 6, 2007), 2 pgs.

Schulze, M., et al., "Optically pumped semiconductor lasers expand the scope of potential applications", Laser Focus World, 42(12), (Dec. 1, 2006), 6 pgs.

Sheik-Bahae, M., et al., "High-sensitivity, single-beam n2 measurements", Optics Letters, 14(17), (Sep. 1, 1989), 955-957.

Singer, S., et al., "The fluid mosaic model of the structure of cell membranes", Science, 175(4023), (Feb. 18, 1972), 720-31.

Steinshnider, J., et al., "Visualizing interfacial structure at non-common-atom heterojunctions with cross-sectional scanning tunneling microscopy", Phys Rev Lett., 85(14), (Oct. 2, 2000), 2953-6.

Wilson, B. S, et al., "Markers for detergent-resistant lipid rafts occupy distinct and dynamic domains in native membranes", Mol Biol Cell., 15(6), (Jun. 2004), 2580-92.

Yang, S., et al., "Mapping ErbB receptors on breast cancer cell membranes during signal transduction", J Cell Sci., 120(Pt 16), (Aug. 15, 2007), 2763-73.

Yarden, Y., "Untangling the ErbB signalling network", Nature Reviews, 2, (Feb. 2001), 127-137.

* cited by examiner

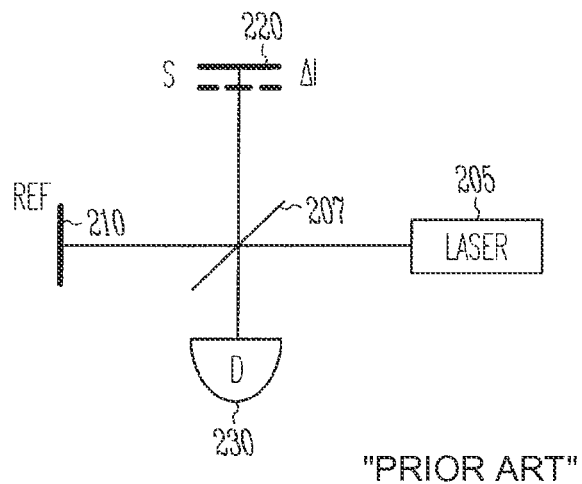
Fig.2 "PRIOR ART"
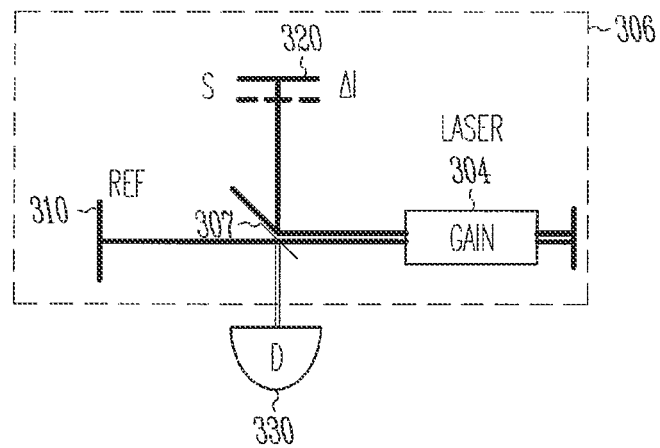
Fig.3

BEAT FREQUENCY (Hz)

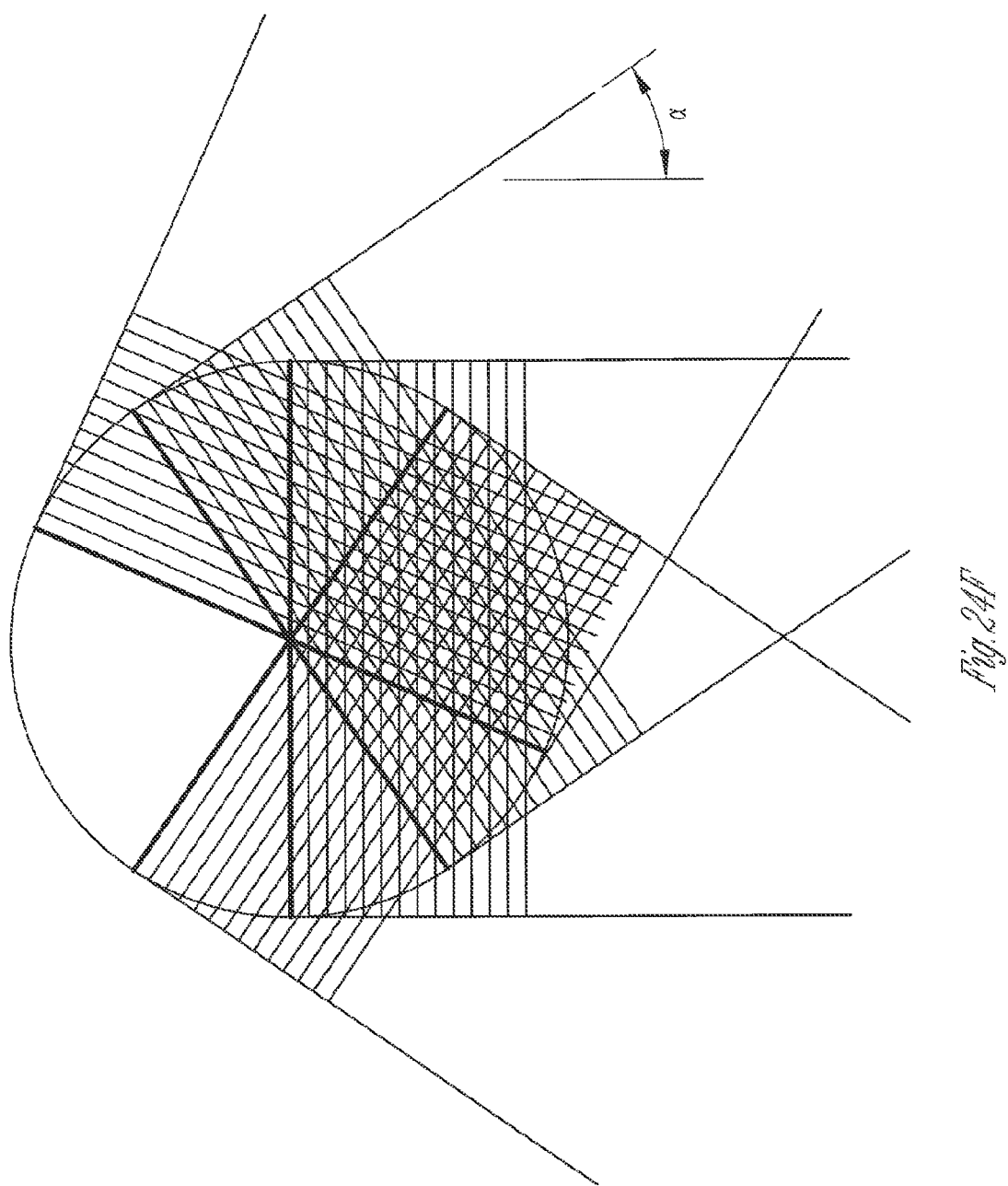

US 8,446,592 B1

SCANNING PHASE INTRACAVITY NANOSCOPE

RELATED APPLICATION

This application claims priority under 35 U.S.C. 119(e) from U.S. Provisional Application Ser. No. 61/137,893, filed 4 Aug. 2008, which application is incorporated herein by reference.

GOVERNMENT INTEREST STATEMENT

This invention was made with Government support under Grant No. NSF ECS-0601612. The United States Government has certain rights in the invention.

FIELD OF THE INVENTION

This invention relates generally to lasers and measurements using lasers.

BACKGROUND

The quest to visualize ever smaller, fainter structures has driven much scientific progresses. Spatial resolution and contrast, essential factors in imaging, are limited by the wavelength and the intensity noise, respectively. While shorter wavelengths (X-rays, electron beams) can improve resolution and fluorescent labeling can increase contrast, these benefits come at the expense of harmful radiation and invasive sample preparation.

The "State of the Art" in conventional optical microscopy is limited by the wavelength. There have been attempts to "break the barrier" of the wavelength. These attempts reach fraction of wavelength resolution. The general trend for improved resolution has been to develop sources and techniques at much shorter wavelengths. The shorter the wavelength, the more harmful the radiation. Most of the techniques with shorter wavelength radiation require complex environmental condition (for instance, in vacuum for the electron microscope), and most generally sophisticated sample preparation.

The resolution of a traditional optical microscope is limited by the maximum spatial frequency that can be transmitted by a microscope objective, leading to a resolution limit of $\lambda/(2n_A)$, where $n_A$ is the numerical aperture of the microscope objective, which is ≈250 nm for visible light microscopy. Current methods that seek to build three-dimensional reconstructions of a sample using the diffraction of light by index of refraction variations, such as Optical Diffraction Tomography (ODT), are ultimately limited by this resolution limit. In addition, in living cells, many structures of interest are either too small or do not have an index difference large enough for suitable contrast. For this reason, fluorescence microscopy has become the most widely used optical technique for studying living cells.

In fluorescence microscopy, the cellular component of interest is labeled with a fluorophore for specificity and contrast. Upon excitation with (usually) visible light, the fluorophore is excited and emits at a longer wavelength, a Stoke's shifted emission that is collected by a microscope objective and separated from the excitation light. For studies of extracellular membrane components, fluorescent probes can be pre-conjugated to ligands or antibodies. Ligand and antibody probes have difficulty passing the cell membrane. Thus for studies of cytoplasmic or nuclear components, cells are typically transfected to express chimeric proteins-proteins containing an additional fluorescent protein such as Green Fluorescent Protein (GFP) or other variants. As expression levels in transfected cells can vary significantly, it becomes difficult to label more than two intra-cellular components simultaneously. In all cases, labeling procedures must be verified to not interfere with normal function.

During imaging, excited fluorophores can undergo a transition from an excited singlet state to a much longer lived triplet state. This long lived state has an increased probability to interact with molecular oxygen, which can both irreversibly chemically alter the fluorophore (photo-bleaching) and create a free radical singlet oxygen that can further damage other molecules in the cell. The destruction of the fluorophore by photo-bleaching limits the amount of emitted and collected photons from each probe, placing restrictions on long term studies and the super-resolution techniques discussed below, which require high signal to noise.

Several techniques have been demonstrated that improve the resolution of the fluorescence microscope. Techniques such as 4π microscopy and $I^5M$ provide a near uniform lateral and z-axis resolution of near 100 nm, using coherent collection by two opposing high-numerical aperture microscope objectives and deconvolution. However, these techniques still rely on a linear response of the probe to excitation light, and merely extend the resolution limit, but do not break it. Both Stimulated Emission Depletion (STED) and saturated patterned excitation microscopy make use of the non-linearity inherent in fluorescence saturation to break the diffraction limit, and both have demonstrated a resolution of better than 50 nm. Recently, several techniques that rely on the photo-activable or photo-switchable fluorescent probes have been demonstrated to give better than 20 nm resolution by building images through the localization of sparse sets of individual fluorescent probes. Localization of single probes can be performed with accuracy of better than 10 nm with relatively few collected photons (<1000), however repetitively preparing (by photo-activation) and imaging a sparse set of emitters leads to collection times of minutes at best. All of these techniques require a fluorescent probe, are limited by signal to noise and are ultimately constrained by photo-bleaching.

BRIEF DESCRIPTION OF THE FIGURES

Embodiments of the invention are illustrated by way of example and not limitation in the figures of the accompanying drawings in which:

FIG. 2 illustrates a Michelson interferometer.

FIG. 3 illustrates a technique in which both a reference mirror and a sample mirror are part of the same laser cavity.

FIGS. 24A-F demonstrate tomographic reconstruction to transfer longitudinal resolution to transverse dimensions.

DESCRIPTION

Figure 1A:
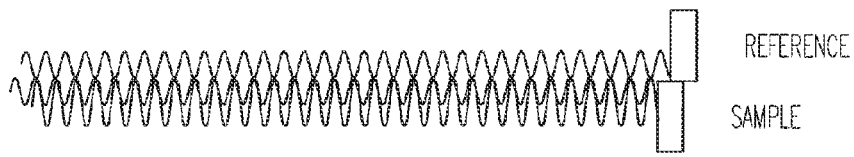
FIG. 1A illustrates superposition of two monochromatic beams of different phase in classical interferometry.

The following detailed description refers to the accompanying drawings that show, by way of illustration, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, apparatus comprise a Scanning Phase Intracavity Nanoscope (SPIN). SPINs can be configured with the carrier frequency of two mode-locked pulse trains used to associate the position of a sample with that of a reference plane. By arranging for the two pulse trains to interfere, a beat note at a frequency proportional to the difference in their position is produced.

In various embodiments, an optical instrument is based on making differential measurements on the phase of two circulating ultrashort laser pulses in order to achieve unprecedented spatial resolution and sensitivity. The underlying physical principles include the conversion of phase (or distance) as small as a billionth ($10^{-9}$) of a wavelength inside a laser to a measurable frequency and the discovery that the injection of even one trillionth ($10^{-12}$) of one pulse into the other is sufficient to change measurably the frequency of the latter. Equipped with mechanical nano-positioners, a complete instrument, which can be called a Scanning Phase Intracavity Nanoscope (SPIN), is unique and provides a novel approach in imaging. Such imaging can have a variety of applications. For example, such imaging can be applied, but not limited to monitoring and controlling drug dynamics at the intra-cellular level.

In various embodiments, the Scanning Phase Intracavity Nanoscope can be realized as a compact instrument that can provide three dimensional images of a biological object, with a spatial resolution of 1 nm, in vivo, using light. The whole instrumentation may be inside an ultrashort pulse laser. The sample to be observed can be in any host material, water or tissue; there is no sample preparation required. It is generally thought that the resolution of an optical microscope is limited by the wavelength of light, about 1 micron. To image smaller objects, the trend has been to go to shorter wavelength (electron microscope, x-rays, etc . . . ), which implies samples in vacuum, and their exposure to harmful radiation. Laser sources from the early days of their existence had been employed in medical, industrial and scientific applications. Their employment, even in most sophisticated fluorescence microscope, was focused on using the energy and color of such sources, ultimately leaving phase, the most delicate property of such sources untamed.

In various embodiments, a method is based on a well established realization that a laser cavity is a unique environment in which a minute change in phase can be converted in a measurable frequency. Unlike existing interferometric metrology, that are based on monitoring the amplitude and hence inherit intensity noise, this method translates a spatial information into frequency, independent of the intensity of the laser pulses. This method is realized by a design to generate optical pulses circulating simultaneously in a laser cavity, labeled as reference and sample pulses, each one switched to its proper destination (reference or sample) at the tail of the cavity. In an example embodiment, the laser runs with $10^8$ such pulses per second, where on a detector the differential phase is converted to a "beat" signal, proportional to the phase change introduced by the sample. As opposed to classical interferometry, where a difference between the intensity of two beams is detected, it is here the difference between two optical frequencies that is detected. A detected beat signal change of 1 Hz corresponds to a phase change of $10^{-7}$, of a displacement resolution of $10^{-14}$ m (or 0.01 pm or 0.0001 Å).

In various embodiments, an intracavity phase technique provides a unique sensitivity to very small scattering at a desired crossing point. The pulse operation provides a specific coupling localization of the order of the pulse length. This technique can be capable of measuring a reflection of an interface of less than one part in $10^{15}$. A manifestation of this property is the SPIN potential to reduce the light level on the sample, and observe a weak return, at the expense of reduced but more desirable spatial resolution (a spatial resolution of 1 nm is more useful than 0.01 pm).

In various embodiments, the transfer of a one-dimensional, sub nm spatial resolution, to all three dimensions with nm resolution can be realized. This can be achieved by scanning the beam not only along transverse coordinates, but rotationally along all directions. The key words in these embodiments, Scanning, Phase, and Intracavity make for the name of such an instrument, Scanning Phase Intracavity Nanoscope or SPIN.

A SPIN can be applied to providing ultrahigh-resolution, three-dimensional (3D) images of objects, biological and others such as semiconductor structures, on the nanoscale, while using light. By exploiting the high sensitivity of the carrier laser frequency to a small perturbation in its cavity, a 1 dimensional (1D) resolution of 1 pm can be achieved. In 3D scanning with one µm wavelength light, the maximum expected resolution is 1 nm$^3$, which is a factor 1000× better than the resolution of any optical imaging system. A phase to frequency conversion in a laser cavity leads to sensitivity up to 1/10000000 of the optical wavelength.

An instrument for Intracavity Phase Interferometry (IPI) involves the following steps:
- Create pulse trains of identical repetition rate inside a laser cavity
- Make the "Carrier to Envelope Offset" (CEO) of these pulse trains proportional to a physical parameter to be measured (angular velocity, acceleration, Fresnel drag, magnetic field, linear and non linear index of refraction, elongation etc . . . )
- Perform measurements of the highest signal to noise ratio by interfering these two pulse trains outside the cavity.

This technique of Intracavity Phase Interferometry (IPI) represents the same breakthrough as the introduction of FM radio was compared to AM radio: the information to be acquired (measured) is contained in a frequency, and is independent of the amplitude of the signal to be measured.

Figure 1B:
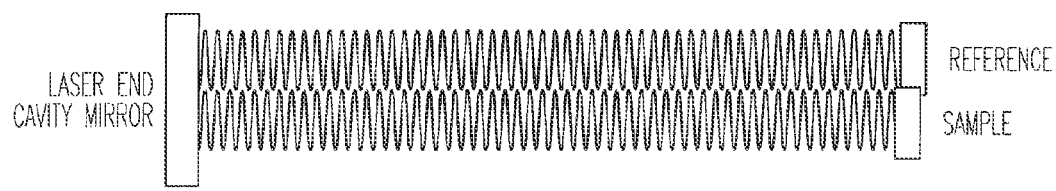
FIG. 1B illustrates intracavity interferometry, in which a sample cavity and a reference cavity are superimposed.
Figure 1C:
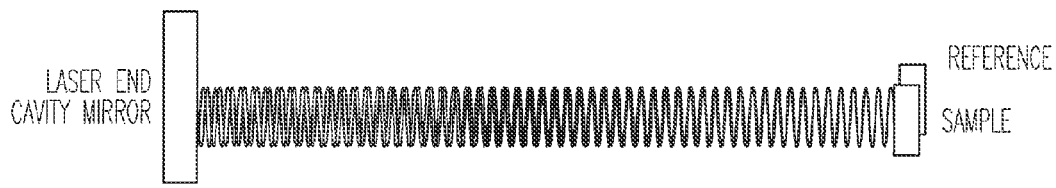
FIG. 1C illustrates a Moire pattern from superimposing a sample cavity and a reference cavity.

In classical interferometry, one measures the intensity difference resulting from the superposition of two monochromatic beams of difference phase, as shown in FIG. 1A. In the intracavity interferometry, a sample cavity and a reference cavity are superimposed. The slight difference in length of each cavity results in a difference in wavelength or optical frequency, as shown in FIG. 1B. Superimposing the two, one can see a "Moire pattern," as shown in FIG. 1C, which can immediately tell the difference in wavelength. A difference of wavelength as small as $\lambda/L \times \lambda$ corresponds to 1 millionth of the wavelength, or 1 picometer. Instead of observing a Moire pattern of two superimposed standing waves, one makes the time domain equivalent: the reference laser is an electric field oscillating at the optical frequency $v_1=c/(\lambda_1)$, the sample laser is an electric field oscillating at the optical frequency $-v_2=c/(\lambda_2)$, one mixes the two signals on a detector to record $v_2-v_1$, which is an optical frequency that can be as small as 1 Hz.

When a need arises to perform a length measurement with higher accuracy, interferometric measurements are typically performed. An example of such an arrangement is the Michelson interferometer sketched in FIG. 2, where a 50% beam splitter 207 sends equal parts of the laser beam from laser 205 to a reference mirror (REF) 210 and a sample mirror—(S) 220. If the two mirrors 210, 220 are at equal distance from the beam splitter 207, a detector (D) 230 sees a large signal V corresponding to the constructive interferences of the beams reflected by both mirrors. If the sample mirror is given a small ($\ll\lambda$) displacement $\Delta l$, the change in detector signal is $V[1-\cos(2\pi\Delta l/\lambda)] \approx 2V(\pi\Delta l/\lambda)^2$. A change of 1 μV over 1 V would imply a displacement of $\Delta l=0.35 \cdot 10^{-3}$ μm.

By contrast, FIG. 3 illustrates a technique in which both a reference mirror 310 and a sample mirror 320 are part of the same laser cavity 306 having gain medium 304 and beam splitter 307, and therefore determine the optical frequency of the laser beams impinging on them. The laser frequency $v=c/\lambda$ should be such that the wavelength $\lambda$ is an exact submultiple of the cavity length, L hence $\lambda=2L/N$. If L is the length of the laser cavity with mirror REF 310, and L+$\Delta l$ the length of the cavity with the sample mirror S 320, the detector D 330 in FIG. 3 will see a modulation at the difference frequency $\Delta v=v\Delta l/L$, or a 70 kHz signal (L≈1 m) for the displacement of 0.35 nm cited above. Such a signal is considerably easier to detect than an amplitude change of 1 μV over 1 V. A frequency change of only 1 Hz can be detected, corresponding to an elongation $\Delta l$ of only $5 \cdot 10^{-6}$ nm.

Nanoscopy can include converting a distance measurement into a phase differential between the two pulses, extending a depth resolution to the transverse dimensions, where tomography is applied, and creating a laser source in which two pulses circulate independently.

Figure 4:
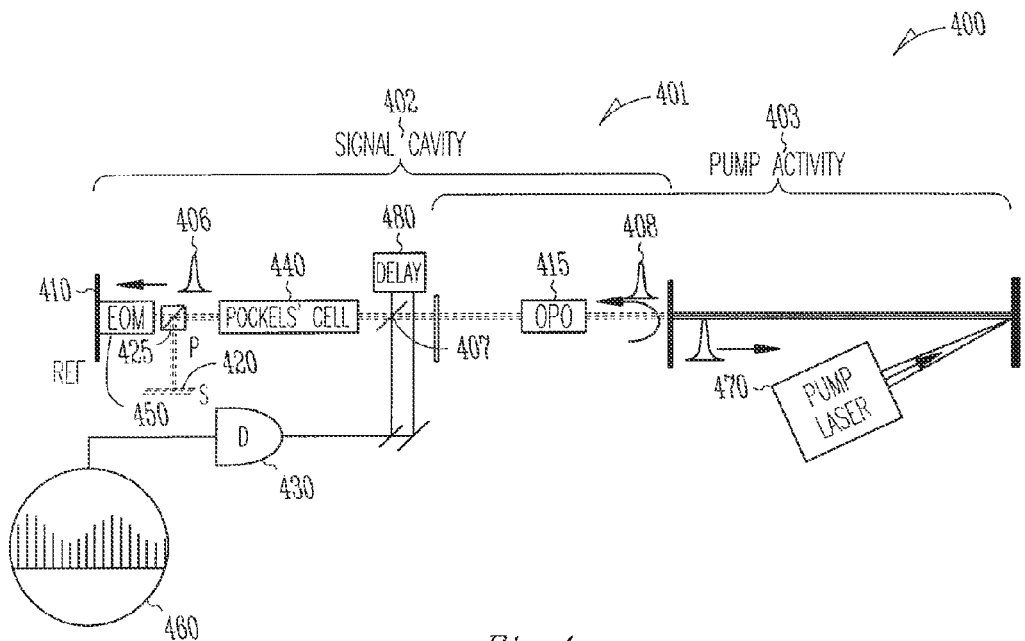
FIG. 4 shows a schematic for a laser configuration for beat note detection in a Scanning Phase Intracavity Nanoscope.

FIG. 4 shows a schematic for a laser configuration 400 for beat note detection in SPIN. Laser configuration 400 includes cavity 401 having a pump cavity 403 and signal cavity 402, which are superimposed on each other with reference mirror 410 and sample mirror 420. Details of the two cavities, such as the gain medium, the saturable absorber, dispersion compensating prisms and modulators are not shown. Laser configuration 400 also includes a pump laser 470 and a delay 480.

Figure 5:
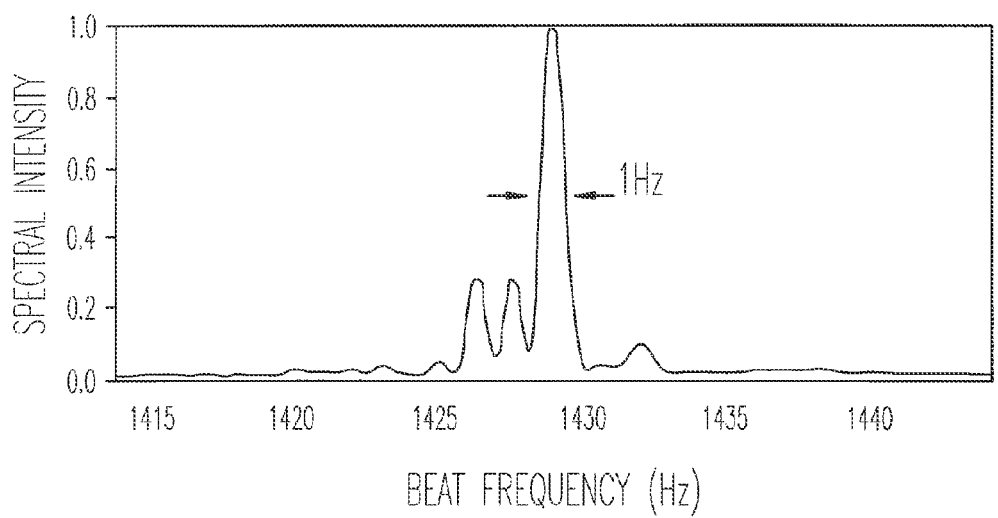
FIG. 5 shows the Fourier transform of the reading of the frequency difference having a bandwidth of 1 Hz, corresponding to the sampling time interval (approximately 1 second).

At each passage of a pump pulse 406 through an optical parametric oscillator (OPO) crystal 415, a signal pulse 408 is generated. In this arrangement, there are two pulses circulating in the signal cavity 402. Each pulse is controlled by a combination of Pockels cell 440 and polarizing beam splitter (P) 425 into the reference arm and the sample arm S, which receives the probe pulse. An electro-optic phase modulator (EOM) 450 in the reference arm takes control of a phase coupling between the two pulses (electro-optic dithering). The two intracavity pulses are extracted from cavity 401 via an intracavity beam splitter 407, and, with appropriate delay, are interfered on a detector D 430. The latter records a pulse train modulated at the "beat frequency" (as shown in the circle 460), which is the difference between the carrier frequencies of the two pulse trains. FIG. 5 shows the Fourier transform of the reading of the frequency difference having a bandwidth of 1 Hz, corresponding to the sampling time interval (approximately 1 second).

In various embodiments, SPIN achieves higher resolution based on the ability to measure a fraction ($1/10^7$) of a wavelength, instead of reducing wavelength to achieve higher resolution. In SPIN, the position of the sample with that of a reference plane is associated with the carrier frequency of two mode-locked pulse trains. Making the two pulse trains interfere produces a beat note at a frequency proportional to the difference in their position. SPIN uses the conversion of phase or sub-wavelength displacement into a beat frequency.

The beat note bandwidth, which is a measure of the spatial resolution of the system, can be quite narrow if the two pulses are correlated. Such is the case if the two pulses originate from the same cavity. The value of the beat note has a lower bound set by the dead band, which itself is an indication of the coupling between the two pulses. The correlation between the dead band and scattering of the surface can be applied to study samples with extreme low reflectivity.

Embodiments of a design of an SPIN, as sketched in FIG. 4, can include one or more of the following characteristics:

1. Optically pumped semiconductor lasers can be used as a gain medium in the pump cavity. This arrangement can provide high gain, high intracavity average power (50 W), and fast gain recovery. Optically pumped vertical cavity surface emitting laser (VCSEL) can be used for high power and beam quality.

2. Wavelength tuning across the visible or near IR can be realized.

3. Multiple quantum wells (MQW), tailored to any pump wavelength, can be used for mode-locking at the pump wavelength.

4. Circulation of two pulses in the same spatial mode of a linear or ring cavity can be achieved through the use of a mode-locked intracavity pumped optical parametric oscillator (OPO). The OPO can be arranged for orthogonality of the repetition rate and mode-frequency control of the pulse trains, which makes the OPO a unique design for stabilization. A 25 mm long periodically poled crystal may be used for the OPO.

However, periodically poled crystal can be used.

5. Differentiation of the two pulses circulating in the cavity to a sample arm of a sub-cavity and a reference arm of another sub-cavity can be controlled with a Pockels cell driven by a phase locked loop at the cavity round trip frequency.

6. An electro-optic phase modulator can be used to control coupling between sample and reference arms.

7. Various resolution enhancement techniques can be implemented for various measurement of a sample. Enhancement of the resolution can be attained using dielectric or metallic nanotips.

8. Nanopositioning of various cavity components and scanning of the sample can be implemented for 3D image reconstruction.

For a pure reflector, the response of the instrument, as shown in FIG. 4, is a beat note:

$$\Delta v = (\Delta l/L)v \quad (1)$$

where $\Delta l$ is the displacement of the sample with respect to the reference surface, $v$ is the light frequency, and $L$ is the cavity length. This response is for the ideal case where the Pockels cell sends 100% of the probe pulse to the sample. Corresponding to $\Delta l$ is a phase shift per round-trip $\Delta\phi = 2\pi\Delta l/\lambda$, and the beat note can be expressed as $\Delta v = \Delta\phi(2\pi\tau_{cav})$ where $\tau_{cav} = L/c$ is the half cavity round-trip time. By applying a smaller voltage to the Pockels cell, the probe pulse intensity becomes only a fraction $\epsilon$ of the intracavity pulsed field. If the sample (field) reflectivity is $\rho$, the returning pulse field is $\xi(t)[(1-\epsilon)+\epsilon\rho e^{i\Phi}]$, which leads to the beat note:

$$\Delta v = (\epsilon\rho\Delta\phi)/(\tau_{cav}) \quad (2)$$

The Fourier transform recording of FIG. 4 shows that beat notes can be measured with an accuracy of 1 Hz, which translates into a depth resolution $\Delta l = 0.5 \cdot 10^{-14}$ m for a wavelength of 1.5 μm and a cavity length of L=1 m. In the case of a membrane interface, having a reflectivity of $\rho \approx 1\%$, with only 1% of the laser power ($\epsilon = 0.01$), the minimum measurable depth variation is $\Delta l \approx 0.5 \cdot 10^{-10}$ m or 0.05 nm.

Existing techniques for nano-imaging can be divided in two main branches of optical and electron or atomic particles, such as scanning tunneling microscope (STM), scanning electron microscope (SEM) and atomic force microscope (AFM). Various embodiments, SPIN may operate to generate one or more characteristics that are not typically attainable by the abovementioned conventional techniques. SPIN may attain a resolution of $10^{-13}$ m in one dimension, and 1 nm$^3$ in three dimensions. The information extracted from SPIN is not limited to the surface. SPIN does not require a vacuum, and can operate in nearly any transparent environment. SPIN is not limited to metallic surfaces, thus does not require special sample preparation. SPIN does not require "marking" by fluorescent dyes, such as is used for a fluorescence nanoscope. SPIN can use lower energy radiation (1 eV) than STM, SEM, or AFM, which can translate to less damage to samples being measured. SPIN can be implemented with appropriate optics to can operate from 800 to 2000 nm, which can provide color information. Unlike other techniques, SPIN is positioned for 3D imaging of proteins in evolving lipids bilayers. In addition, recognizing that the SPIN is a laser instrument that can be sensitive to environmental parameters, such as acceleration, magnetic fields, air currents etc, the SPIN is positioned for combination with sensors of acceleration, rotation, and/or magnetic fields that may result in an essentially totally autonomous instrument.

SPIN can be applied to a one-dimensional measurements ranging from measurement of an essentially perfect reflector to measurement of a low reflectivity surface. Combining the depth scanning with lateral scanning of near field microscopy can result in a full three dimensional reconstruction of a sample. Even though each additional dimensionality can compromise the resolution of measurement, a 3-D instrument including an embodiment of an SPIN may have a resolution of 1 nm$^3$ or 1/1000 of the wavelength of the illuminating source.

As discussed for the high reflector samples, the beat note response is solely dependent on the sample position, independent of the value of the (field) reflectivity $\rho$. The beat note response to the differential cavity length is linear, and the principle of superposition applies. Thus, the spectrum of the beat note contains information on the longitudinal structure of a sample.

Since the repetition rate is stabilized through the pump cavity, one can stabilize the reference arm to keep the mode position constant. Direct measurement of the beat note frequency provides the displacement of the "sample arm" with respect to the reference arm. Relative vibrations of the two arms of the OPO cavity, which can inject noise in the beat note, should be eliminated or significantly reduced. In another measurement technique, related to control of the reference arm, consists of controlling the movement of the reference mirror using a piezo-element in contact with the reference are and using a feedback loop to maintain the beat note at a constant value. The displacement of the sample mirror can then be inferred from the current in the feedback loop.

Another parameter that can be scanned is the position of the reference mirror. The value of the beat note can be function of the displacement and the beam splitting ratio at the polarizer P, shown in FIG. 4. A scaling factor can be introduced by the reflectivity p of the sample and the beam splitting ratio $\epsilon$. Hence, the depth measurements can be combined with material imaging. For a low reflector sample, measurements may include detailed analysis of the tip positioning and sample environment.

A Pockels cell is used to switch periodically each of the intracavity pulses towards a different subcavity, one serving as reference, the other as "sample". The non-limiting examples that follow and FIG. 6 pertain to a laser, or any gain medium, operating at a cavity round-trip rate of 90 MHz (pulse repetition rate 180 MHz).

Figure 6:
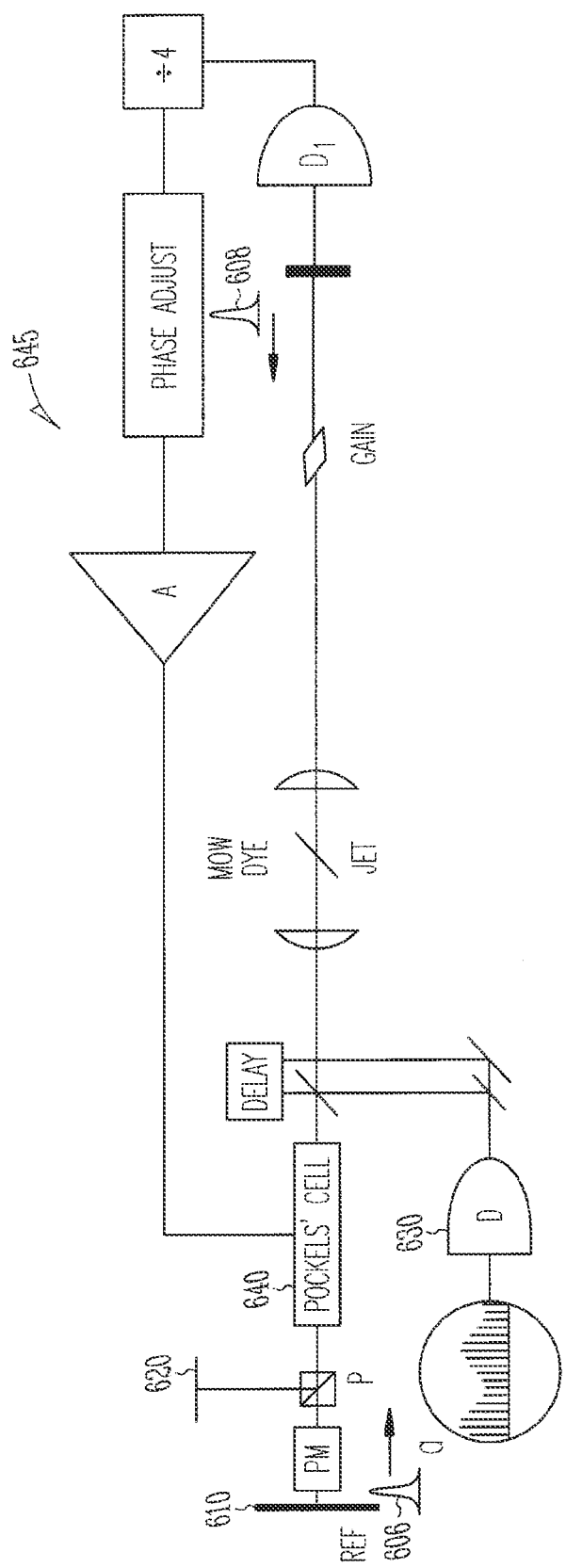
FIG. 6 shows a sketch of a laser cavity for length measurements.

FIG. 6 shows a sketch of a laser cavity for length measurements. For such measurements, a cavity includes a gain medium that can be any laser gain medium. An OPO crystal is an example of such gain medium. Pulse 606 circulates in the cavity that includes mirror REF 610, while the pulse 608 is deflected towards the mirror S 620 by the Pockels cell 640. Since there are two pulses (equally spaced) circulating in the cavity, the repetition rate recorded on the detector D 630 is L/c=180 MHz. This signal is divided by 4 to drive a phase locked loop 645, and be applied after amplification and phase adjustment to the modulator. The peak value of the modulation voltage (positive or negative) is to coincide with the arrival of pulse 608, which is polarization rotated by 90° to be deflected towards the mirror 620.

Even for a one dimensional measurement, the sample is not necessarily a single 100% reflector, nor is it desirable to deflect the whole power of the laser pulse into it. A cavity length around 1.7 m (round-trip frequency of 90 MHz) can be used. A shorter cavity length may be preferable.

Assume a cavity round-trip frequency of 90 MHz. Two approaches to driving the modulator are outlined in following subsections. The two approaches include a modulator operating at 90 MHz and a modulator operating at 45 MHz. For a modulator operating at 90 MHz, a 180 MHz signal from a photodiode 731 is divided by 2, amplified, sent through an adjustable delay 736, an amplifier 737, and the modulator, as sketched in FIG. 7.

Figure 7:
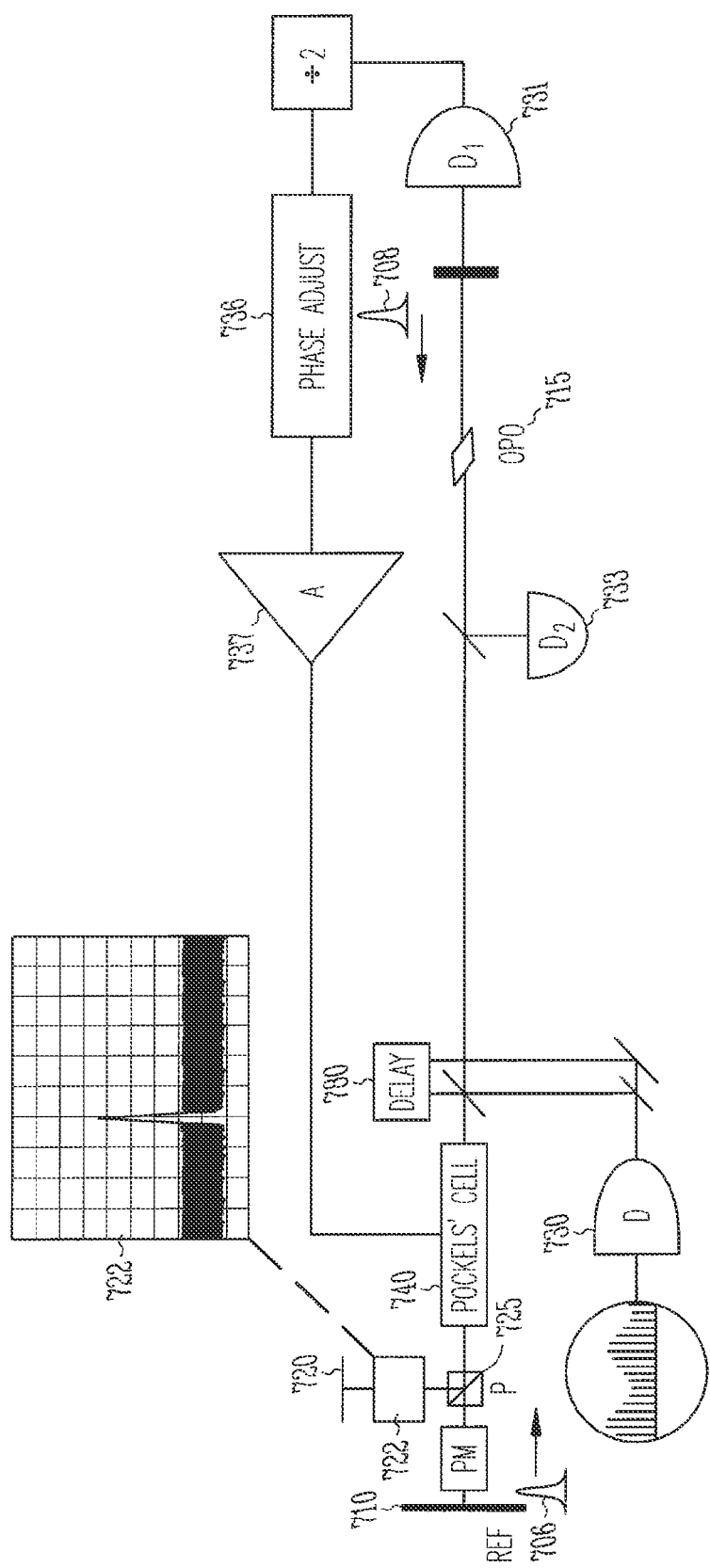
FIG. 7 illustrates a modulator operating at 90 MHz.
Figure 8:
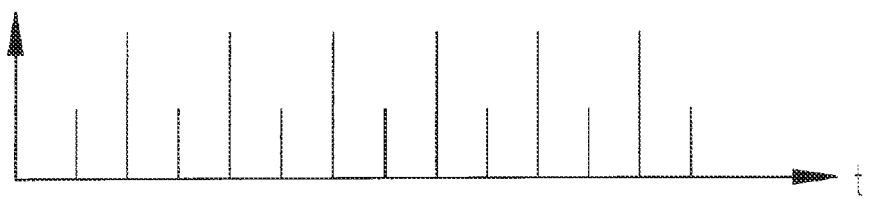
FIG. 8 illustrates pulse intensity at modulator (180 MHz) for the configuration of FIG. 7.
Figure 9:
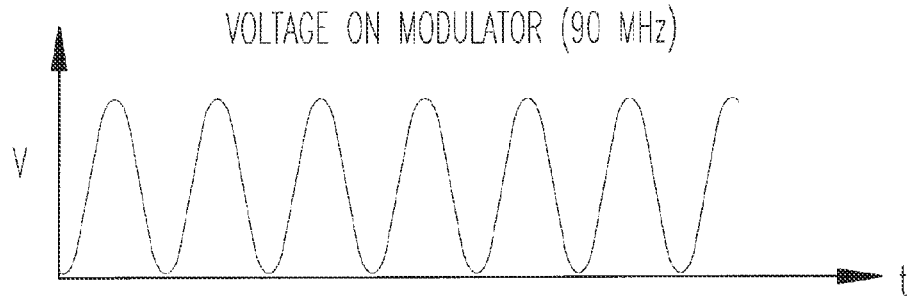
FIG. 9 illustrates voltage on modulator (90 MHz) for the configuration of FIG. 7.

In FIG. 7, the laser configuration includes reference mirror 710, sample 720, modulator 722, beam splitter 725, Pockels cell 740, delay 780, OPO 715, detector 730, and detector 733. As shown in FIG. 7, since there are two pulses, pulse 706 and pulse 708, circulating in the cavity, the detectors $D_1$ or $D_2$ record a signal at 180 MHz, which is divided by 2, phase adjusted, amplified before being sent to the Pockels cell 740. Unless the two pulses returning to the polarizing beam splitter 725 are exactly dephased by $\pi$ (relative displacement of $\lambda/4$ of the two mirrors of the end-cavity interferometer) pulse 708 will be attenuated as sketched in FIG. 8. Because of the reduction of intensity of pulses 708, a component at 90 MHz appears in the spectrum analyzer recording of the pulse train on detector $D_2$. That 90 MHz component is used in a feedback loop to maintain the bias of the phase modulator 722 for the minimum loss condition. FIG. 9 shows the voltage on modulator at 90 MHz.

The signal from the fast photodetector $D_1$ is sent through a high pass filter, a TTL converter, divided by 2. An accurate delay line is used to ensure that the zero and maximum voltages in the modulator correspond to the arrival time of the optical pulses. A couple of amplifiers are used to boost up the signal to the half-wave voltage. The pulse train is monitored through detector $D_2$ with an oscilloscope, frequency counter and spectrum analyzer. With the present system, the mode-locking is considered "good" when repetition rate fluctuations on the frequency counter are less than 100 Hz.

Figure 10:
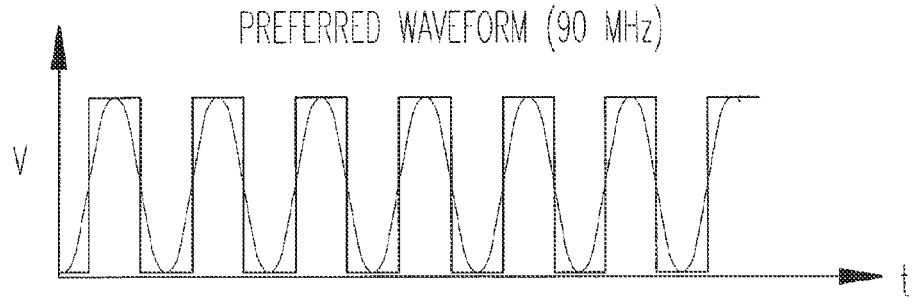
FIG. 10 illustrates a square wave drive (90 MHZ) for the configuration of FIG. 7.

The electrical drive at 90 MHz should ideally be a square wave as shown in FIG. 10. Such a wave could be approximated by adding some odd harmonics. It may be possible that the third harmonic at 270 MHz would be sufficient.

The 90 MHz signal to the modulator is from zero to a half wave voltage (90 degree rotation of the polarization). In the case of the tantalate modulator that we have, the "zero" requires a bias of −50V, to which we have to add a peak to peak voltage of 170 V.

Figure 11:
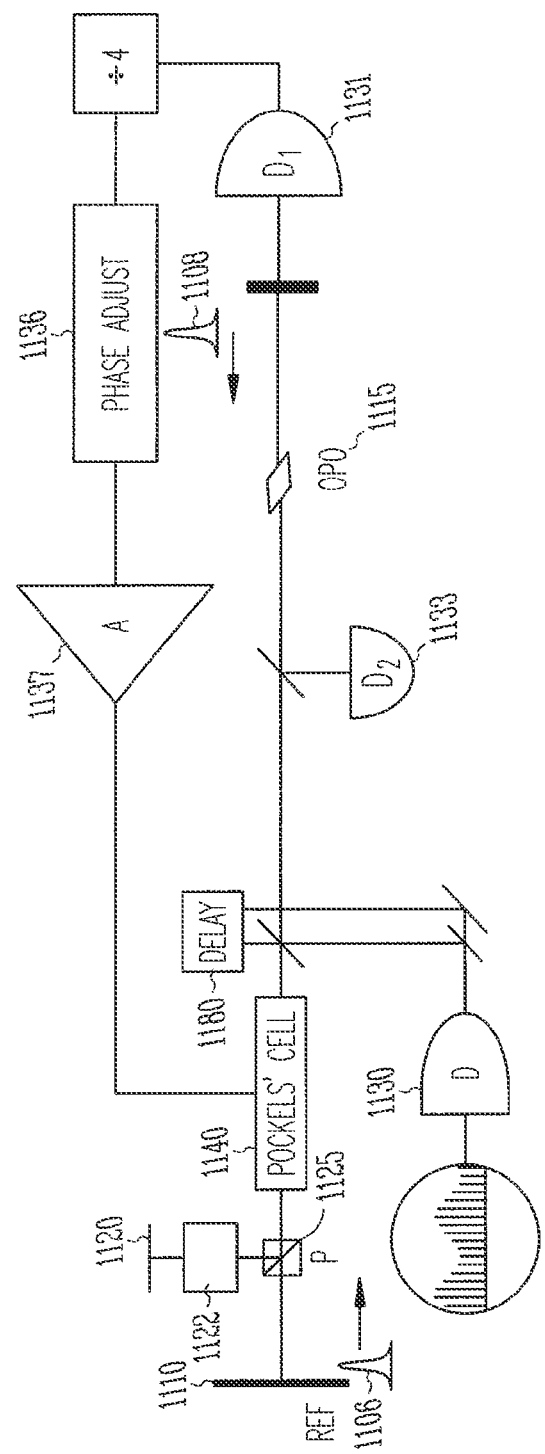
FIG. 11 illustrates a modulator operating at 45 MHz.

FIG. 11 illustrates a modulator operating at 45 MHz. An alternative to the modulator drive of FIG. 7 is to operate between 0 V (transmitting the pulse) and ± the half wave voltage $\pm V_\pi$. The advantage is a lower frequency, the disadvantage that twice the peak-to-peak voltage of the previous section is required.

Figure 12:
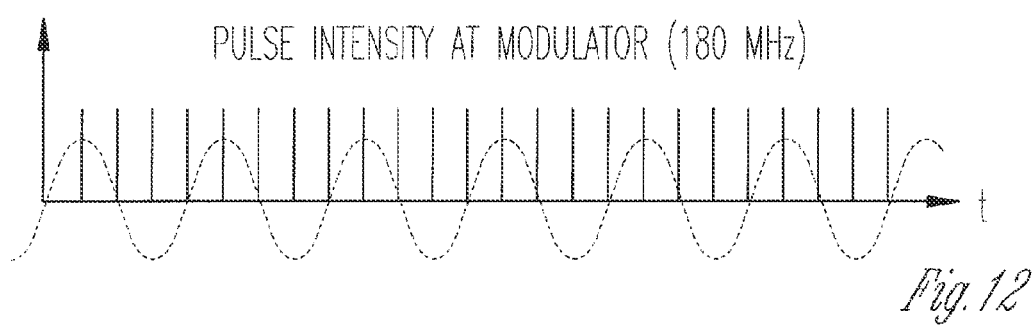
FIG. 12 shows pulse intensity at modulator (180 MHz) for the configuration of FIG. 11.
Figure 13:
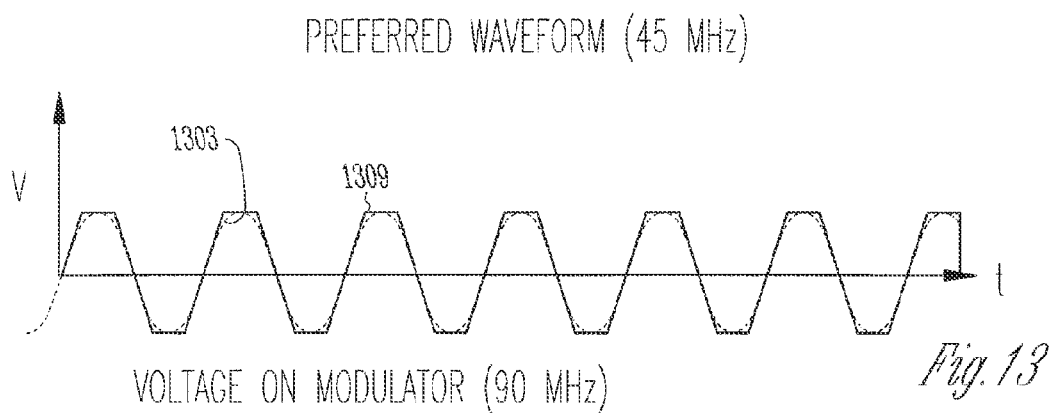
FIG. 13 shows voltage on modulator (90 MHz) and preferred drive waveform for the configuration of FIG. 11.

In FIG. 11, the laser configuration includes reference mirror 1110, sample 1120, modulator 1122, beam splitter 1125, Pockels cell 1140, delay 1180, OPO 1115, detector 1130, detector 1131, detector 1133, phase adjust 1136, and amplifier 1137. The signal recorded by detector $D_1$ is now divided by 4. Pulse 1106 crosses the modulator at the null of the electric field. Pulse 1108 crosses at the (+) and (−) peaks of the modulation. FIG. 12 shows pulse intensity at modulator (180 MHz). FIG. 13 shows voltage 1303 on modulator (90 MHz) and preferred drive waveform 1309.

The purpose of the calculations below is to show how the depth resolution is compromised against the power that is sent to the "sample". If the entire power of one pulse is deflected to the sample, the beat note is considerably higher than if only a small fraction is deflected (for the same displacement of the sample).

Before entering the modulator, the light is vertically polarized, along an axis $y_1$, orthogonal to a horizontal axis $x_1$. The initial field is $E_{x1}=0$, $E_{y1}=1\cdot\exp(i\omega t)$. We project that field on the main axis $y_m$ and $x_1$ of the modulator (oriented at 45°):

$$E_{xm}=E_{y1}\cos\theta_1=(1/\sqrt{2})e^{i\omega t}$$

$$E_{ym}=E_{y1}\sin\theta_1=(1/\sqrt{2})e^{i\omega t} \quad (3)$$

The modulator introduces a difference in phase (which we will put on the axis $y_m$) $\Delta$. At the output of the modulator:

$$E_{ym}=E_{y1}\sin\theta_1=(1/\sqrt{2})e^{i(\omega t+\Delta)}. \quad (4)$$

After the modulator, we project again on vertical y horizontal x axis:

$$E_x=\tfrac{1}{2}(1-e^{i\Delta})e^{i\omega t}$$

$$E_y=\tfrac{1}{2}(1+e^{i\Delta})e^{i\omega t} \quad (5)$$

After the beam has been split by the polarizing beam splitter, the returning beams recombine after having been given a relative phase shift $\phi$:

$$E_x=\tfrac{1}{2}(1-e^{i\Delta})e^{i\phi}$$

$$E_y=\tfrac{1}{2}(1+e^{i\Delta}) \quad (6)$$

The beam returns towards the modulator. Projecting on the modulator axis:

$$E_{xm}=(1/\sqrt{2})(E_x+E_y)=(1/2\sqrt{2})[1+e^{i\phi}+e^{i\Delta}(1-e^{i\phi})]$$

$$E_{ym}=(1/\sqrt{2})(E_y-E_y x)=(1/2\sqrt{2})[1-e^{i\phi}+e^{i\Delta}(1+e^{i\phi})] \quad (7)$$

The modulator imparts another phase change of $\Delta$ on the ym component $E_{ym}\rightarrow E_{ym}\times\exp(i\Delta)$. The components along $y_m$ and $x_1$ of the pulse re-entering the main cavity are thus:

$$E_{x1}=(1/4)[(1-e^{i\Delta})+e^{i\phi}(1+e^{i\Delta})+e^{i\Delta}(1-e^{i\Delta})-e^{i\phi}e^{i\Delta}(1+e^{i\Delta})]$$

$$E_{y1}=(1/4)[(1+e^{i\Delta})+e^{i\phi}(1-e^{i\Delta})+e^{i\Delta}(1+e^{i\Delta})-e^{i\phi}e^{i\Delta}(1-e^{i\Delta})], \quad (8)$$

which can be re-written:

$$E_{x1}=(1/4)[(1-e^{i\Delta})(1+e^{i\Delta})(1+e^{i\phi})]$$

$$E_{y1}=(1/4)[(1+e^{i\Delta})^2+e^{i\phi}(1-e^{i\Delta})^2]. \quad (9)$$

From this last set of equations, it is obvious that $\phi=\pi$ returns the correct polarization independently of $\Delta$. $E_{x1}=0$ and $E_{y1}=\exp(i\Delta)$, which implies a huge value of the beat note $\Delta/\tau_{RT}$.

There are two special limits to the phase shift $\Delta$: near zero and $\pi$. The ideal value is $\Delta=\pi$, which corresponds to a rotation of the polarization by 90°, consistent with the set of Eqs. (5). For $\Delta=\pi$:

$$E_{x1}=0$$

$$E_{y1}=e^{i\phi}. \quad (10)$$

Let us now consider a small departure from this ideal condition: $\Delta=\pi-\epsilon$. For small $\epsilon$, the set of Eqs. (9) becomes:

$$E_{x1}=(1/4)[i\epsilon(2-i\epsilon)(1+e^{i\phi})]$$

$$E_{y1}=(1/4)[(i\epsilon)^2+e^{i\phi}(2-i\epsilon)^2]. \quad (11)$$

The x component of the field represents a loss of the order of $\epsilon$ in field, $\epsilon^2$ in intensity. Besides the loss of the y component of the field to the x component, it has a phase shift that remains equal to $\phi$ to first order.

Feedback can be introduced to maintain the x component zero. The imposes that we set $\phi=\pi+\eta$, where $\eta$ is a small value ($\phi$ being maintained near $\pi$ by a feedback loop, $\eta$ being a small phase modulation imposed by a phase modulator. The set of Eqs. (9) becomes:

$$E_{x1} \approx \epsilon\eta(2-i\epsilon)$$

$$E_{y1} \approx e^{i(\eta-\epsilon)}. \quad (12)$$

The price to pay for a smaller loss, in the case of $\phi$ close to $\pi$, is a reduced beat note. The loss should be maximum rather than minimum in order to have a beat note equal or close to $\phi$. Indeed, the intensity loss is:

$$|E_{x1}|^2 = (1-\cos 2\Delta)(1+\cos \phi) \quad (13)$$

which is maximum for $\phi$ close to zero, minimum for $\phi$ close to $\pi$.

The small $\Delta$ approximation of Eqs. (9) is:

$$E_{x1} \approx \tfrac{1}{2} i\Delta(1+e^{i\phi})$$

$$E_{y1} \approx \tfrac{1}{2}[1+i\Delta-(\Delta^2/4)(1+e^{i\phi})]. \quad (14)$$

What is the meaning of these equations? If $\phi$ is small, there is a significant loss as shown by Eq. (13), and a phase shift which is a not so straightforward function of $\Delta$ and $\phi$. If $\phi$ is close to $\pi$, the losses are practically zero. The phase shift is proportional to the product of $\Delta$ and $\phi$.

Complete information on the reflection and depth of an interface is extracted from the knowledge of the voltage applied to the Pockels cell the power (attenuation) of the laser, and the beat note frequency.

A SPIN instrument is based on a robust implementation of the structure of FIG. 3. There are two stringent conditions to be met. First, the two beams should essentially overlap perfectly in the common branch of the laser. Second, there should be essentially no coupling between the phases of the laser beams.

The second condition can be met by having two ultrashort pulses circulating in either cavity, and ensuring that they never meet in any location where scattering takes place. This implies that the pulses should not overlap near a solid or an interface. This property of null coupling is related to the absence of dead band in a laser gyroscope operating with ultrashort pulses. The laser sketched in FIG. 14 has a gain element (labelled OPO 1415) that creates two individual pulses in the resonator. Pulse 1406 uses the subcavity with the mirror REF 1410, while pulse 1408 uses the subcavity S sample 1420.

Figure 14:
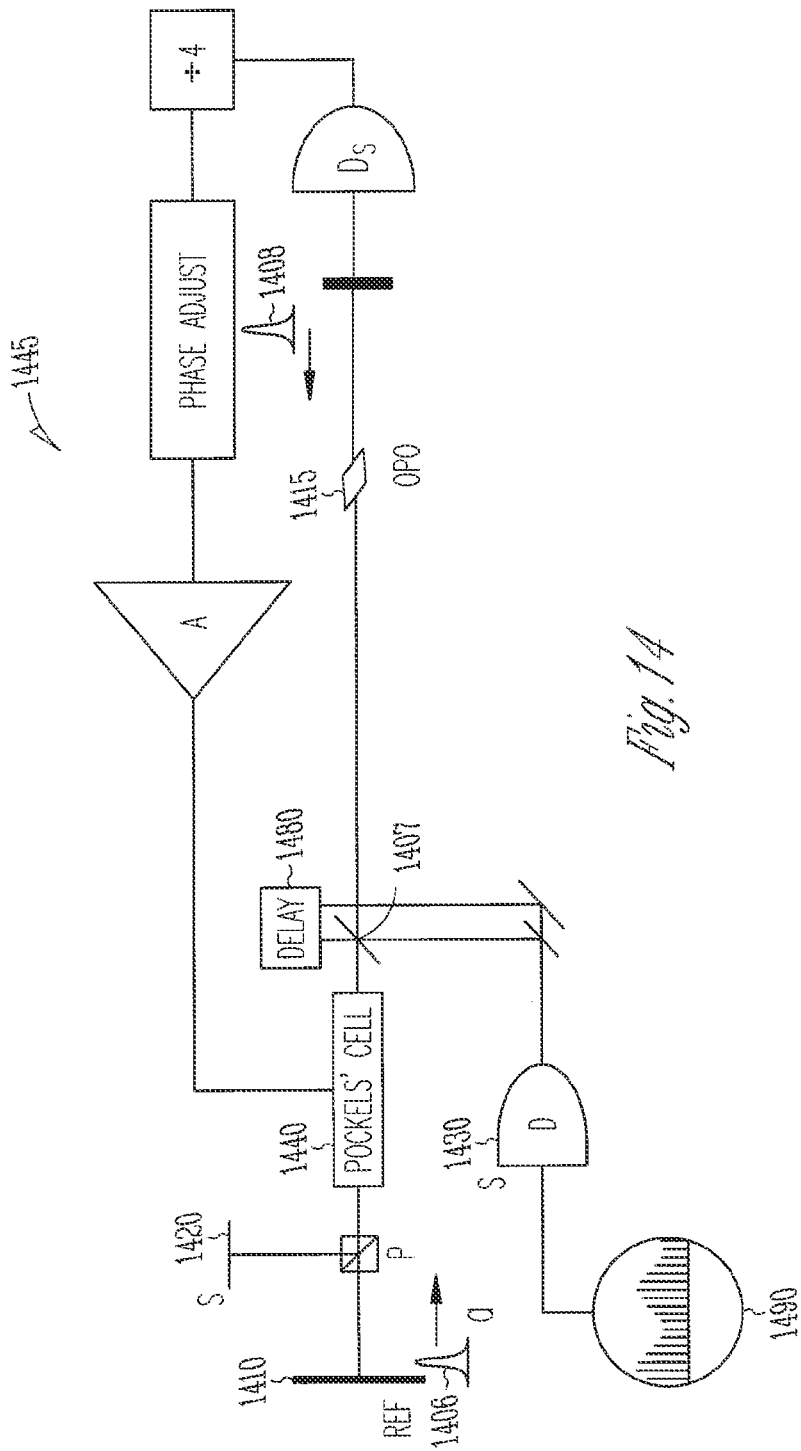
FIG. 14 shows a sketch of an implementation of the principle of FIG. 3.
Figure 15:
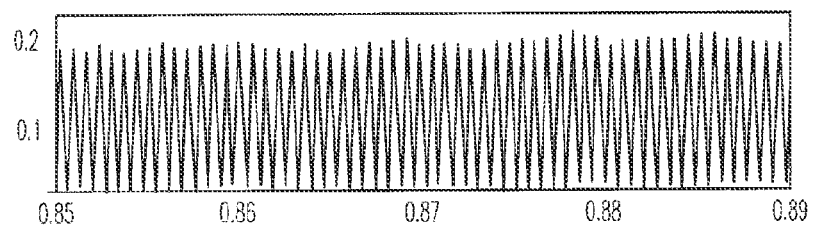
FIG. 15 shows a measurement using the Scanning Phase Intracavity Nanoscope of FIG. 14.
Figure 16:
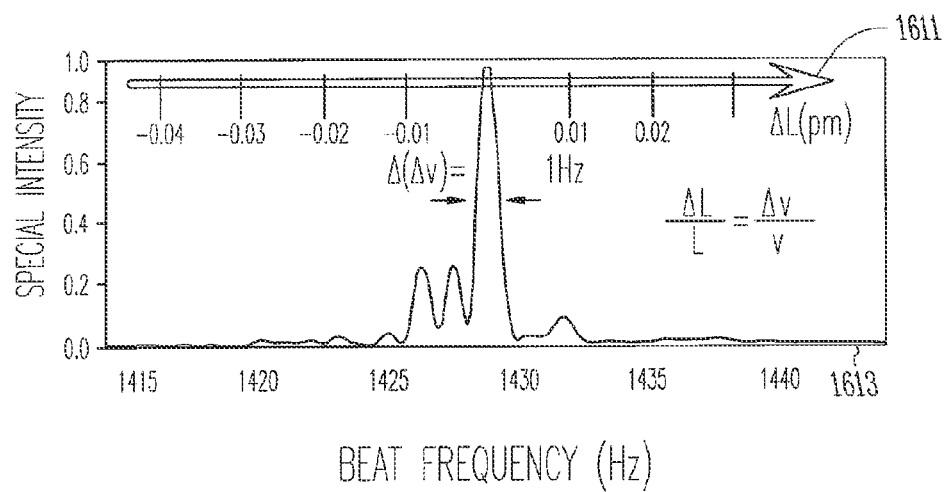
FIG. 16 shows the spectrum of the data from the measurement of FIG. 15 with the displacement scale (in pm) and its corresponding frequency scale.

FIG. 14 shows a sketch of an implementation of the principle of FIG. 3. Pulse 1406 circulates in the cavity that includes mirror REF 1410, while 1408 is deflected towards the mirror S 1420 by the Pockels cell 1440. Since there are two pulses (equally spaced) circulating in the cavity, the repetition rate recorded on the detector D 1430 is L/c=180 MHz. This signal is divided by 4 to drive a phase locked loop 1445, and be applied after amplification and phase adjustment to the modulator. The peak value of the modulation voltage (positive or negative) is to coincide with the arrival of pulse 1408, which is polarization rotated by 90° to be deflected towards the mirror 1420. FIG. 15 shows a measurement using the SPIN. FIG. 16 shows the spectrum of the data with the displacement scale (in pm) 1611, corresponding to the frequency scale 1613.

The optical frequency $v = N c/2L$ of each of these pulses is such that there are an integer number N of wavelengths $\lambda = c/v$ the corresponding cavity. Each of the two pulses is sampled by a beam splitter 1407 in the center of FIG. 14, and given appropriate optical path delay 1480 so that they meet simultaneously on a detector D 1430. The frequency of the signal detected on D is $\Delta v = v\Delta l/L$, and thus a measure of the position of mirror S, insofar as mirror REF is a fixed position. Some cavity laser stabilization can be implemented to maintain the length of the cavity seen by pulse 1406 constant. A technique for stabilization of mode-locked lasers can be implemented.

FIG. 14 includes oscilloscope trace 1490 of the signal recorded on the beat note detector (D) 1430. Because the measurement of the beat frequency depends linearly on the position of the reflecting interface, the structure seen in the spectrum carries information on depth structure of the reflecting sample.

In various embodiments, an element that produces the two pulses is a periodically poled lithium niobate crystal, used as optical parametric oscillator (OPO). At each passage of a "pump pulse" of optical frequency $v_p$, two pulses of frequency $v_i$ and $v$ such that $v_p = v + v_i$ are generated. The pulse of frequency $v$ is the one that is circulated in the cavity of FIG. 14, twice per round-trip time in that cavity. A similar two-pulse/cavity intracavity pumped OPO can be realized in which the pump pulse is produced by a Ti:sapphire laser, itself pumped by a vanadate laser pumped by semiconductor lasers. Such a configuration may be cumbersome, costly, and difficult to maintain. A more efficient laser, which is directly electrically pumped, is a ring laser with a tapered amplifier.

Figure 17:
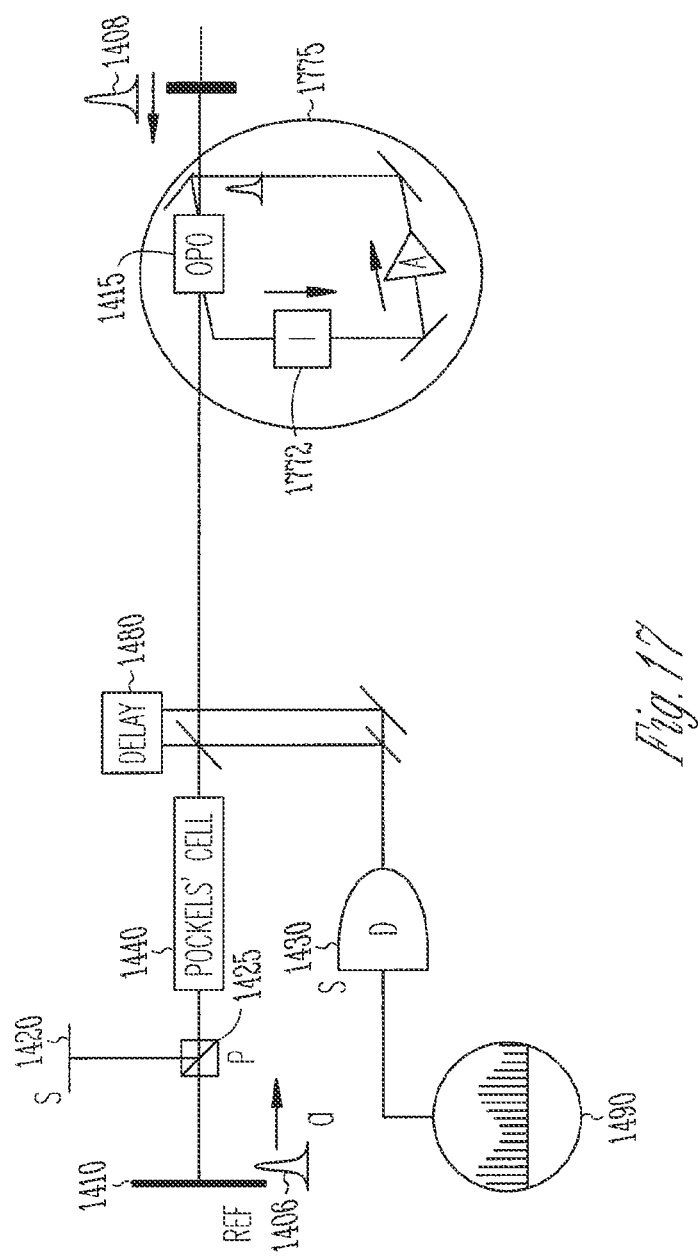
FIG. 17 shows the instrument of FIG. 14 in which a pump cavity for the optical parametric oscillator is shown.

FIG. 17 shows the instrument of FIG. 14, showing the pump cavity for the OPO 1415. I denotes an optical isolator 1772, that allows only counter-circulating operation in that ring cavity 1790. As sketched in FIG. 17, the pump pulse circulates counter clockwise in ring cavity 1775, being amplified at each passage through the tapered amplifier. Because the perimeter of the pump cavity is equal to the length of the linear cavity, two pulses are produced in the latter.

A second exceptional feature of the SPIN, after its extraordinary depth resolution, is its sensitivity to extremely faint interfaces. A main advantage of using visible lasers for imaging biological objects would be lost if we had to focus the full power of the laser onto the sample. It is desirable to sample only a fraction $\in$ of the laser beam towards the sample, which will reflect only a fraction p. Both $\in$ and p are field reflection coefficients; the intensity reflection coefficients being $\in^2$ and $p^2$. The problem of locating an interface (relative to the position of the reference mirror) becomes now two dimensional: both the "displacement" $\Delta l$ and the reflection coefficient $\rho$ are unknown. The technique to extract these parameters is based on the influence that minute backscattering has on the operation of the laser, in particular the beat note.

Figure 18:
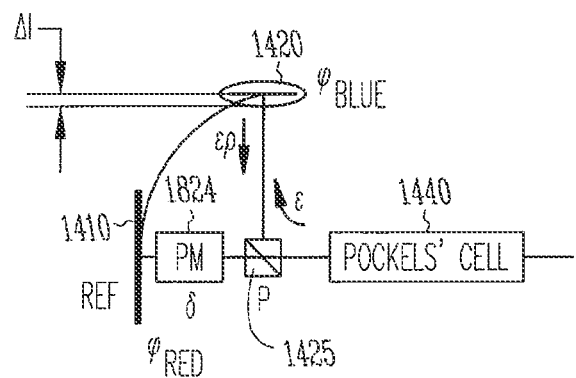
FIG. 18 shows an expanded view of the end laser cavity where a phase modulator is disposed as an additional component.

To determine these parameters another element is added to the instrument: a phase modulator, PM, 1824 in FIG. 18 (which is an expanded view of the end laser cavity). In FIG. 18, phase modulator 1824 is inserted between the reference mirror 1410 and the polarizing beam splitter 1425. Phase modulator 1824 introduces an artificial displacement $\delta$ of the reference mirror. The amplitude of the signal applied to the Pockels cell can be controlled, such that only a fraction $\in$ of the signal is sent to the sample interfaces S 1420, which in turn reflect only a fraction p of the light.

Figure 19:
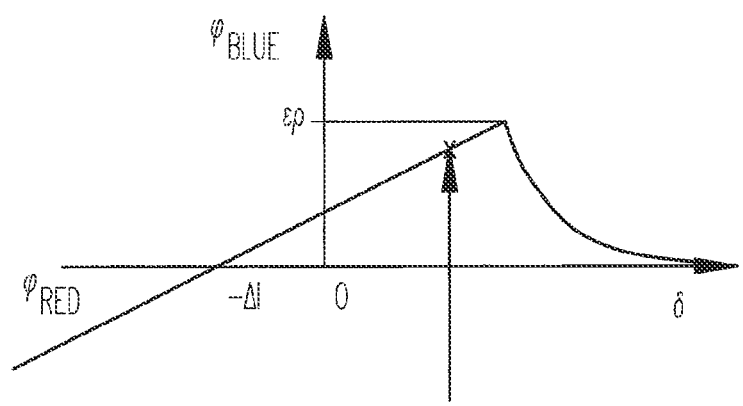
FIG. 19 shows the variation of the beat note with respect to the configuration of FIG. 18.

The beat note that is being measured is the difference in phase experienced by the pulse 1406 propagating in the arm $\overline{PS}$, $\phi_{red}$ (subscript red refers to pulse 1406) and the phase of the pulse 1408 propagating in the arm $\overline{PREF}$, $\phi_{blue}$, (subscript red refers to pulse 1408), divided by the round-trip time $T_{RT}$ of the cavity: $\Delta v = (\phi_{red} - \phi_{blue})/(2\pi\tau_{RT})$. If the difference between cavity lengths $\Delta L = \Delta l + \delta$ is less than a wavelength, the fields will add, resulting in a beat note $\Delta v = \epsilon p v \Delta L/L$. Despite the reduced response, the sensitivity is still remarkable: with 1% light sent to the sample ($\epsilon = 0.1$) and a reflectivity of 11,100,000,000 ($p = 10^{-4}$), we still have a resolution of 1 nm. By scanning the phase shift $\delta$, the variation of the beat note follows the curve shown in FIG. 19, which is similar to the "lock-in" characteristics of a laser gyro. Measurements of the beat note versus δ make it possible to determine the two unknowns p and Δl. There is a linear relationship for small beat notes; the zero beat note corresponding to δ−Δl. As the beat note increases, the injection of the arm S into the arm REF unlocks when $\Delta\nu = p \in /(2\pi\tau_{RT})$. The zero and maximum of the recording Δν(δ) leads thus to he determination of Δl and the reflectivity p.

Even for a perfectly localized metallic reflector, there is a finite width to the response of the instrument represented by the Fourier Transform in FIG. 16. This uncertainty in position may be related to mechanical vibrations of laser components and can be minimized through appropriate stabilization. Correction to fluctuations in length of the reference cavity should affect equally either of the two pulses circulating in the laser.

In contrast to existing conventional systems, the signal in SPIN has two dimensions: frequency and intensity. Beat note frequencies give a direct handle on the longitudinal structure while any variation of reflectivity across the sample relates directly to transverse structure. Different options for achieving the highest transverse resolution can be implemented. Such options include, but are not limited to, use of fiber tips, use of high numerical aperture objectives combined with local field enhancement techniques, and use of "nanojet" concentration of light achieved with microspheres.

Focused ion beam milling can be used to improve the use of tapered fiber probes. Dithering the fiber tip in a controlled, fine motion can be used as a means to achieve sub-wavelength transverse resolution. Such sub-pixel-level displacements have recently been demonstrated as a practical technique to reduce aliasing from detector-sub-sampled images. The use of multiple-core fibers can combine high beam throughput with high spatial resolution. The high spatial resolution can be extracted from a detailed analysis of mode and field patterns.

Figure 20:
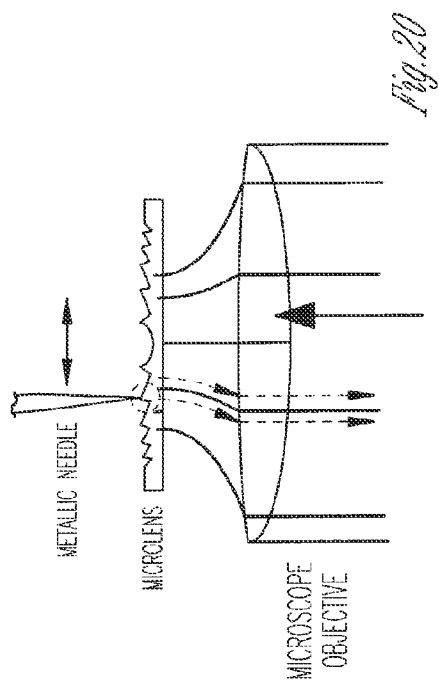
FIG. 20 shows a schematic of the imaging of a microlens exploiting the local field enhancement of a metallic needle.

Fine metal tips may be used to enhance locally—within the focal area of the high aperture microscope objective—the backscattered field. FIG. 20 shows a schematic of the imaging of a microlens exploiting the local field enhancement of a metallic needle. The sharp metal tip localizes the optical radiation near the apex of the tip, which implies a larger backscattered radiation from that area. As applied to a microlens, scanning the tip under the microlens, one should be able to reconstruct the shape of the grooves of the micro-lens pattern.

Figure 21:
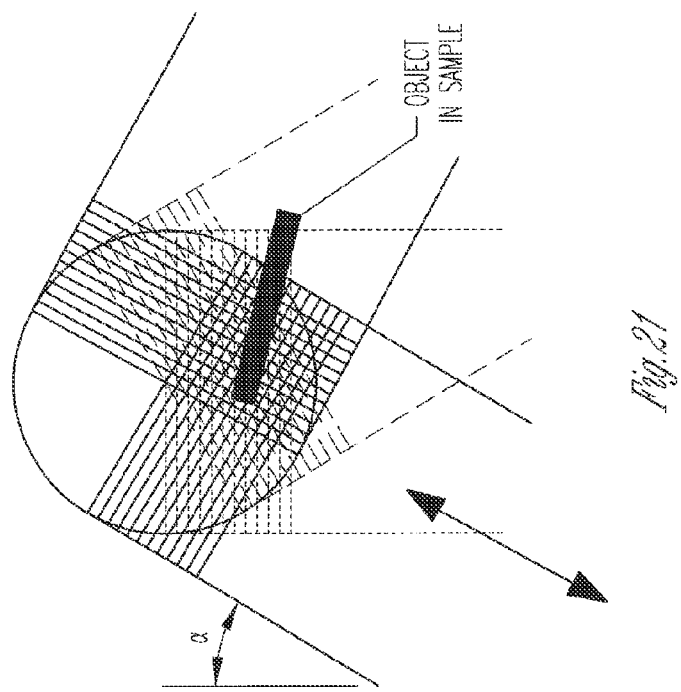
FIG. 21 shows the depth scanning and views under different angles for tomographic reconstruction.

In the case of fiber tip illumination, different angles of view can be obtained simply by rotating the tip. In the case of microscope objective illumination, a hemisphere covering the sample can be used, similar to the "numerical aperture increasing lens" designed by Goldberg, et al. FIG. 21 shows the depth scanning and views under different angles for tomographic reconstruction. A modified tomographic reconstruction algorithm is designed to extend the depth resolution [longitudinal "grid" in the sketch of FIG. 21] to the transverse dimension, which otherwise is limited to the diameter of the circle in FIG. 21.

Figure 22:
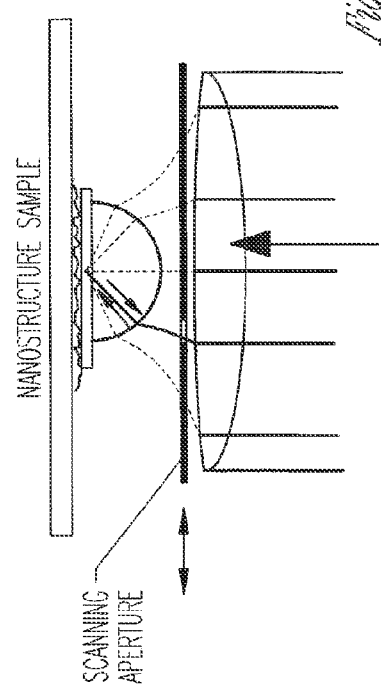
FIG. 22 shows that different angle views can be obtained by scanning of an aperture above a hemispherical lens.

These different angle views can be obtained by scanning of an aperture above a hemispherical lens, as shown in FIG. 22. Angular scanning can be obtained by scanning an aperture between the microscope objective and the lens, as sketched in FIG. 22.

With respect to use of microspheres, a microsphere acts as a microlens for a plane wave incident on it, resulting in a concentration of the radiation in a volume of nanosize or "nanojet". Such microspheres can be implemented in the laser cavity of the SPIN.

Figure 23:
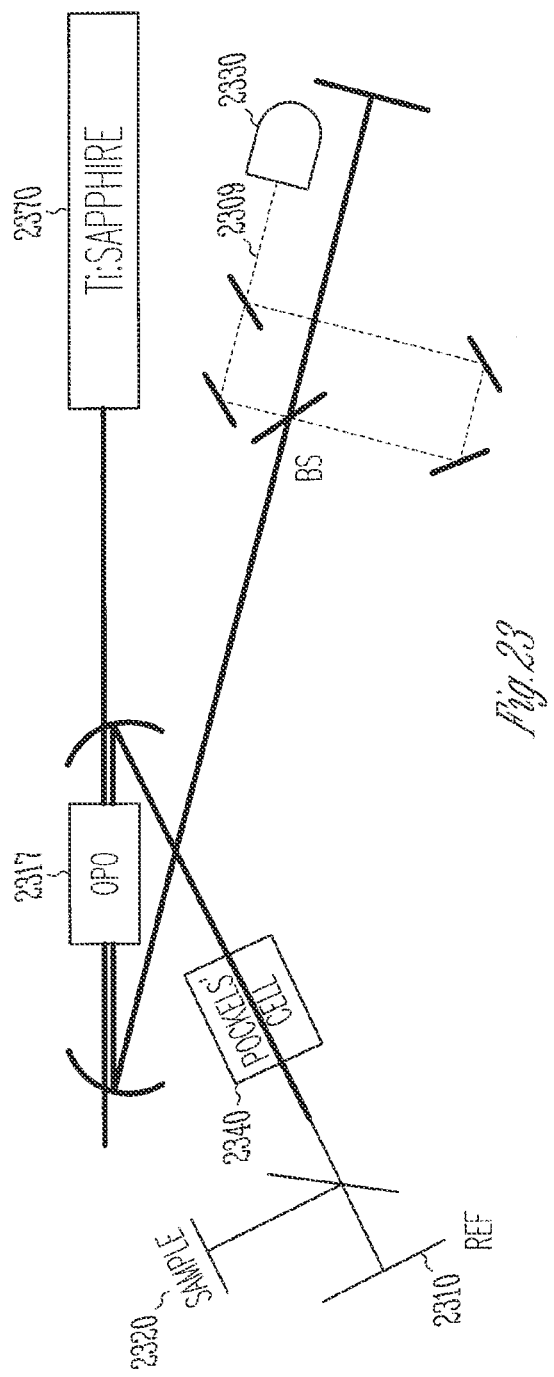
FIG. 23 shows an optical parametric oscillator cavity pumped by a mode-locked Ti:sapphire laser.

FIG. 23 shows an OPO cavity pumped externally by a mode-locked Ti:sapphire laser 2370 of half the length of the OPO cavity, such that two independent pulses are resonated in the OPO. Frequency tuning is achieved with a birefringent filter inside the pump cavity. OPO 2317 can include a periodically poled lithium niobate (PPLN) crystal. For example, the pump pulses are focused into a 3 cm long periodically poled 5% MgO doped lithium niobate crystal inside the OPO cavity. The crystal temperature is stabilized at 32° C. The arrangement for the two independent pulses includes Pockels cell 2340, reference mirror 2310, and sample 2320. The beams extracted from the cavity and made to interfere on the detector 2330 are shown as dotted lines 2309. Two completely independent pulses circulate in the OPO sketched in FIG. 23, pumped by the same spatial mode of the pump laser, if the pump cavity is half the length of the OPO cavity.

Two pulses/round-trip are created in the signal cavity if two-counter-propagating pump pulses are sent into the OPO crystal at each round-trip. This configuration has may be unstable. However, the insertion of a frequency doubling inside the OPO cavity can remove the instability.

SPIN includes data acquisition and manipulation. The method of SPIN provides the desired depth measurement with sub-nm resolution, while the transverse resolution is that of a scanning near-field microscope. Analysis includes disentangling sub-nm depth resolution from sub-μm transverse resolution. Qualitatively, the measured (or raw) depth resolution is that which is obtained by PSF (point-spread function) averaging of the fine depth resolution over the lateral dimensions of the beam. The problem is akin to that of optical super resolution, where resolution exceeding the optical diffraction limit can sometimes be attained in the presence of sufficient prior knowledge about the image by means of image processing. The acquisition of many different rotated views of the sample at high depth resolution should facilitate the use and development of novel 3D tomographic reconstruction techniques to solve this disentanglement problem. The basic principle is sketched in FIG. 21. A modified tomographic reconstruction algorithm can be designed to extend the depth resolution [longitudinal "grid" in the sketch of FIG. 21] to the transverse dimension, which otherwise is limited to the diameter of the circle in FIG. 21, which is demonstrated with FIGS. 24A-F.

Figure 24A:
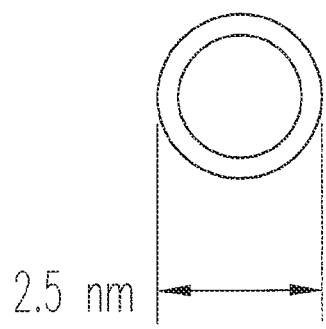
Figure 24B:
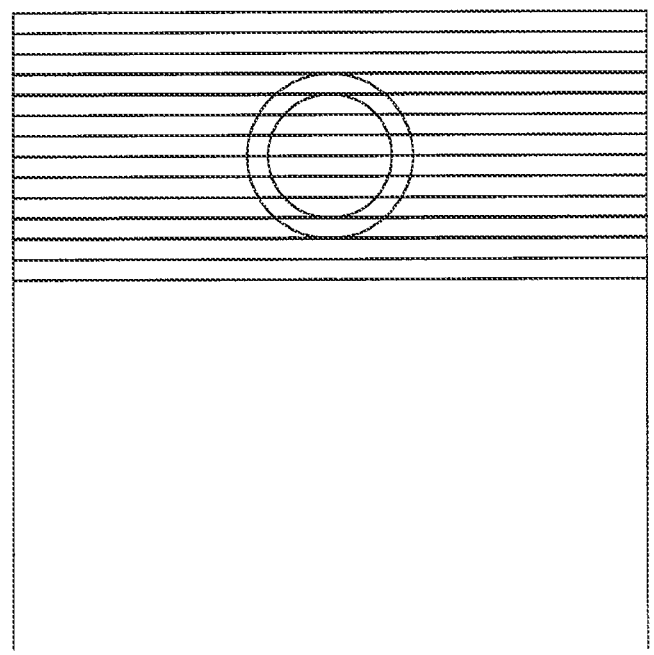
Figure 24C:
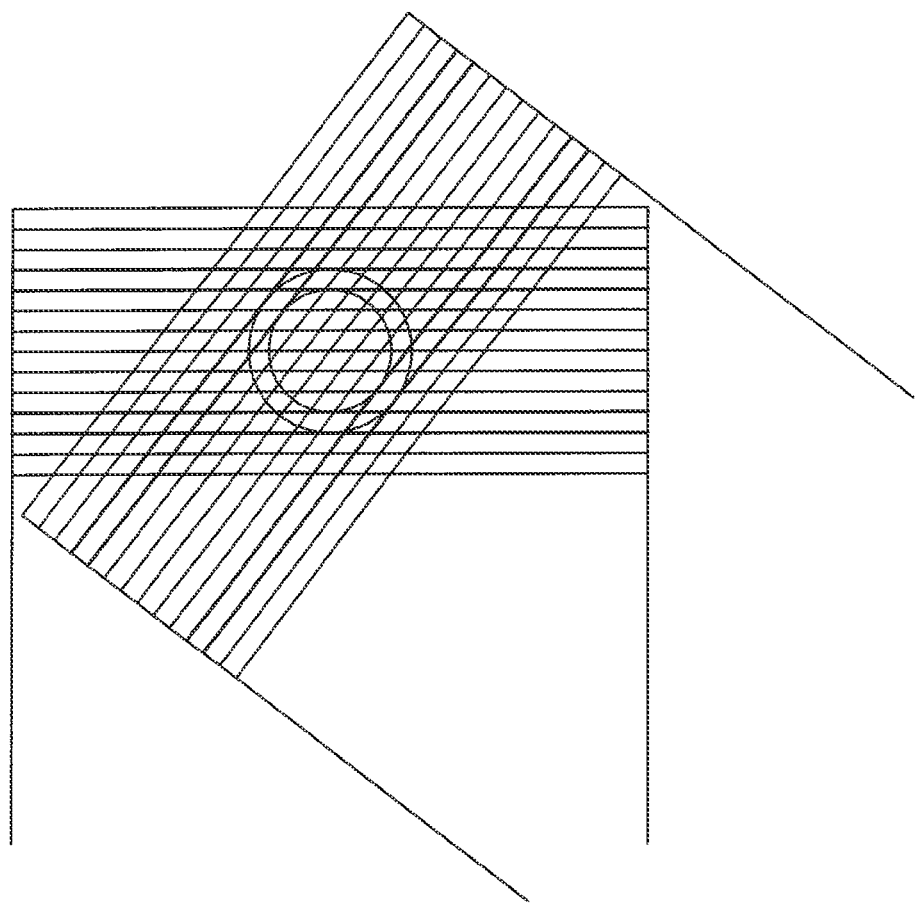
Figure 24D:
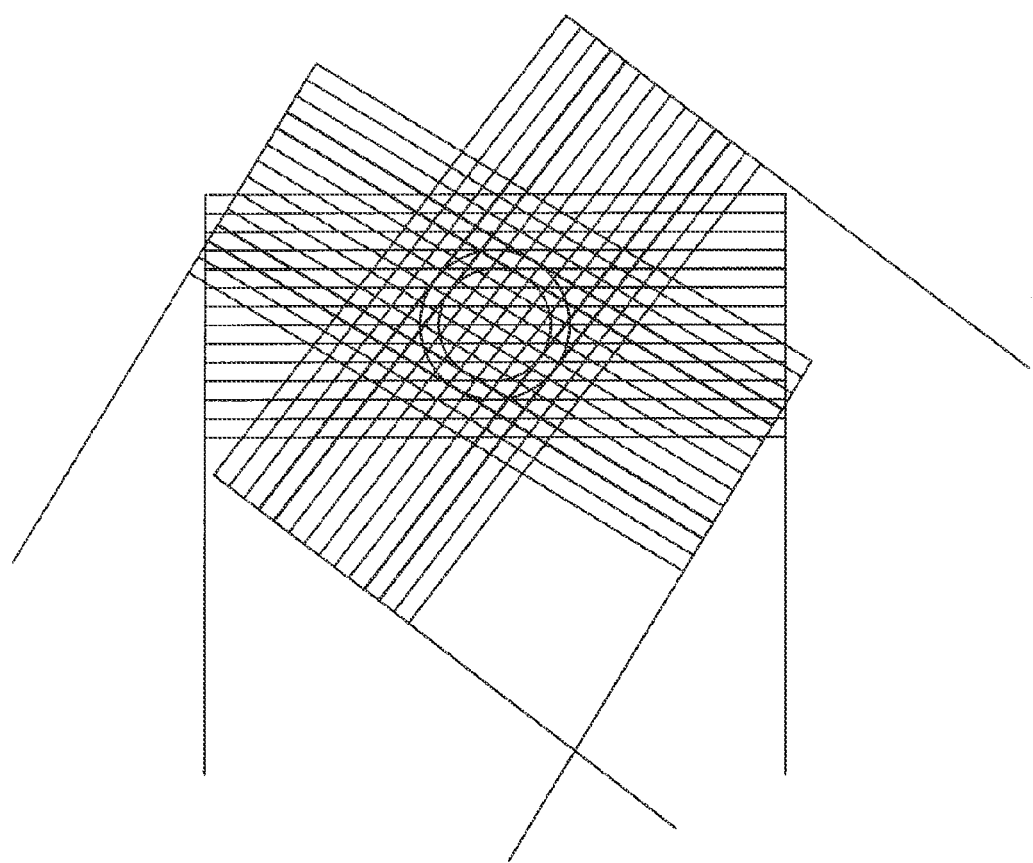
Figure 24E:
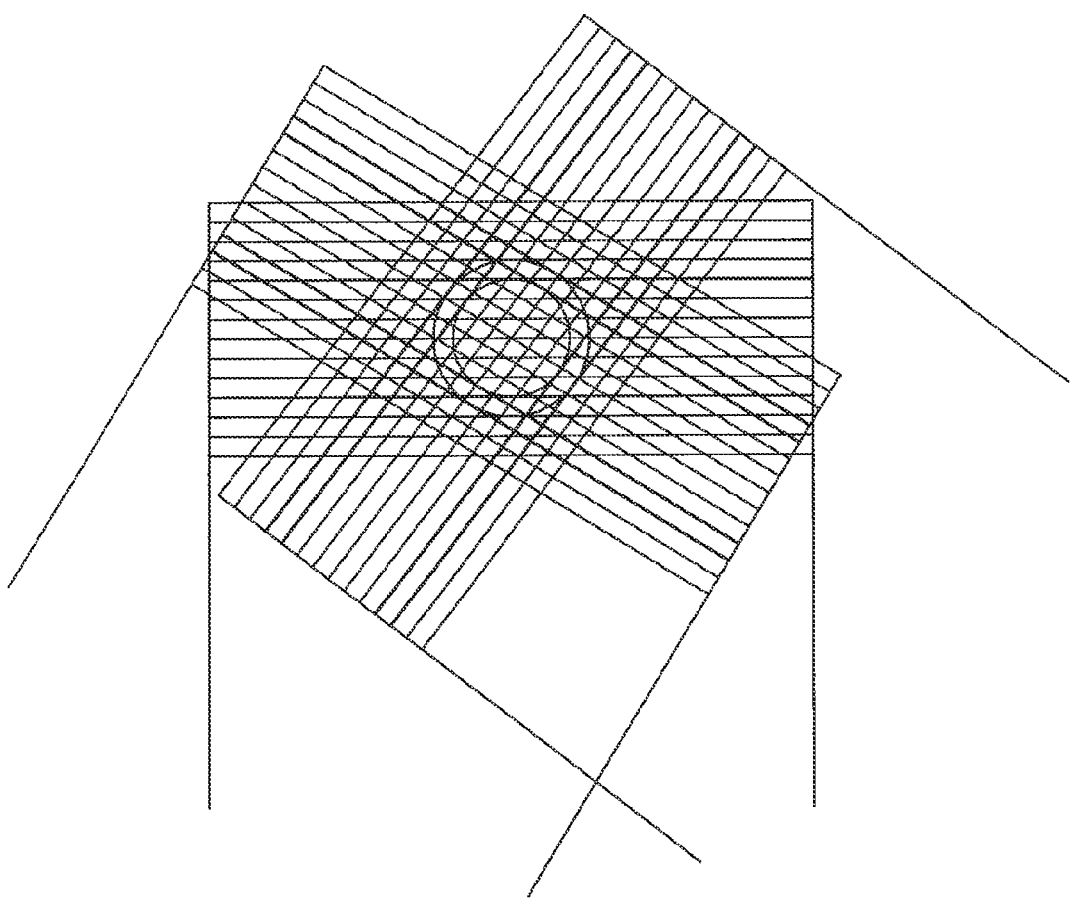

FIGS. 24A-F demonstrate tomographic reconstruction to transfer longitudinal resolution to transverse dimensions. In FIG. 24A, assume a nano bilayer sphere, such as a liposome, 2.5 nm diameter. Perform in addition a longitudinal scan, with a transverse resolution of 10 nm and a depth resolution of 0.2 nm. FIG. 24B shows the result as four larger returns corresponding to the four interfaces normal to the beam. Perform next a longitudinal scan from another angle. FIG. 24C shows the result is again four larger returns. Perform another longitudinal scan from another angle as indicated in FIG. 24D. Perform again another longitudinal scan from another angle as indicated in FIG. 24E. FIG. 24F shows results from the multiple scans.

Two other factors can be taken into consideration to expand further the scope of a SPIN: the polarization response and the wavelength response. A rigorous microscopic point-dipole analysis of probe-sample interaction can serve as basis to the polarization response of the instrument. As for the wavelength response, the wavelength of the OPO can be tuned within the range of reflectivity of the optics. Alternatively, a design can include a laser with interchangeable optics. The ability to operate at various wavelengths is particularly important for biological samples. In some instances, one might desire to select a wavelength for which the sample is most transparent (in order to detect interfaces below other layers). Another consideration is to select a wavelength for which a resonant enhancement of the index of refraction exists, hence increasing the contrast of the image.

The SPIN device is intrinsically a scanning instrument that will generate and have to process vast amounts of data in a rapid tomographic fashion to realize its principal goal of ultrahigh 3D resolution. This requires a high-performance computational platform directly interfaced with the optical instrument and processing information as it is acquired by the instrument.

SPIN can have direct application to real biological problems. The responses of a biological cell to its surrounding environment result largely from the transduction of signals from the outer cell surface to the cytoplasm and nucleus. Strict regulation of signal transduction is crucial for cell survival, differentiation, proliferation and other activities. Unregulated signaling is an important component in the pathogenesis of many diseases, especially cancer. However, many aspects of how the cell maintains spatio-temporal control of signaling pathways remain unclear.

In the above detailed description, reference may be made to specific examples by way of drawings and illustrations. It is to be understood that the above description is intended to be illustrative, and not restrictive, and that the phraseology or terminology employed herein is for the purpose of description. Features or limitations of various embodiments described herein do not necessarily limit the inventive subject matter as a whole, and any reference to the invention, its elements, operation, and application are not limiting as a whole, but serve only to define these example embodiments. The above detailed description does not, therefore, limit embodiments of the invention.

What is claimed is:

1. An apparatus comprising:
a pump laser cavity;
a laser cavity having a sample arm and a reference arm such that a reference pulse and a sample pulse operatively are generated from the laser cavity, wherein a measurement of a sample in the sample arm is based on a difference frequency between the sample pulse affected by the sample and the reference pulse unaffected by the sample.

2. An apparatus comprising:
a reference laser cavity;
a sample laser cavity operatively formed by a sample to be measured such that the reference laser cavity and the sample laser cavity are superimposed upon each other, wherein a measurement of the sample is based on differences in the reference laser cavity and the sample laser cavity determined from a first laser beam from the reference laser cavity and a second laser beam from the sample laser cavity;
a gain medium through which to propagate the first laser beam and the second laser beam, the first laser beam having a first optical frequency and the second laser beam having a second optical frequency, the gain medium common to the reference laser cavity and the sample laser cavity;
a beam splitter arranged to provide output the first laser beam with the second laser beam; and
a reference mirror arranged with the gain medium and the beam splitter as a portion of the reference laser cavity to determine first optical frequency, wherein the beam splitter is arranged to reflect the second laser beam to the sample, the second optical frequency determined by arrangement of the sample, the beam splitter, and the gain medium as a portion of a sample laser cavity.

3. The apparatus of claim 2, wherein the gain medium includes an optically pumped semiconductor laser.

4. An apparatus comprising:
a reference laser cavity;
a sample laser cavity operatively formed by a sample to be measured such that the reference laser cavity and the sample laser cavity are superimposed upon each other, wherein a measurement of the sample is based on differences in the reference laser cavity and the sample laser cavity determined from a first laser beam from the reference laser cavity and a second laser beam from the sample laser cavity, wherein the sample has a reflectivity substantially less than that of a reference mirror of the laser reference cavity, the reference mirror arranged as an end mirror of the laser reference cavity.

5. An apparatus comprising:
a pump laser cavity;
a signal laser cavity operatively formed by a sample arm and a reference arm such that a reference laser pulse and a sample laser pulse are operatively generated from the signal laser cavity, wherein a measurement of a sample is based on a difference in the reference laser pulse and the sample laser pulse; and
a controller operable with the signal laser cavity such that pulses are alternately directed to the sample arm and the reference arm and such that intensity of light directed into the sample is regulated.

6. The apparatus of claim 5, wherein the controller includes a Pockels cell.

7. The apparatus of claim 6, wherein the apparatus includes phase locked loop to drive the Pockels cell.

8. The apparatus of claim 5, wherein the apparatus includes a multiple quantum well to mode-lock a laser that includes the pump laser cavity and the signal laser cavity.

9. The apparatus of claim 5, wherein the apparatus includes an optical parametric oscillator disposed in the superimposed pump laser cavity and signal laser cavity, the optical parametric oscillator arranged in a path of the reference laser beam and the signal laser beam.

10. The apparatus of claim 5, wherein the apparatus includes an electro-optic modulator controlling coupling between a sample arm of the signal laser cavity and a reference arm of the pump laser cavity.

11. The apparatus of claim 5, wherein the apparatus includes a nanotip disposed external to the of the signal laser cavity and a reference arm of the pump laser cavity such that in operation the sample is disposed between the nanotip and the signal laser cavity.

12. The apparatus of claim 5, wherein the apparatus includes a detector disposed to detect to detect a difference between an optical frequency of the reference laser beam and an optical frequency of the signal laser beam.

13. The apparatus of claim 5, wherein the apparatus includes a positioning drive to move a reference mirror of the reference laser cavity a distance such that the distance has a resolution on the order of nanometers.

14. The apparatus of claim 5, wherein the apparatus includes an optically pumped vertical cavity surface emitting laser to provide optical input to the pump cavity.

15. A method comprising:
generating a first laser beam in a reference laser cavity, the first laser beam having a first optical frequency;
generating a second laser beam in a sample laser cavity, the sample laser cavity operatively formed by a sample to be measured such that the reference laser cavity and the sample laser cavity are superimposed upon each other, the second laser beam having a second optical frequency; and outputting the first laser beam and the second laser beam such that a difference between the first optical frequency and the second optical frequency is determined.

16. The method of claim 15, wherein the method includes controlling a repetition rate of pulses of the first laser beam using a mode-locked intracavity pumped optical parametric oscillator.

17. The method of claim 15, wherein the method includes controlling the intensity of the second laser beam directed to the sample.

18. The method of claim 17, wherein controlling the intensity of the second laser beam includes driving a Pockels cell using a phase locked loop.

19. The method of claim 15, wherein the method includes optically pumping a set of semiconductor lasers as gain medium in the pump cavity 20. The method of claim 15, wherein the method includes analyzing the difference between the first optical frequency and the second optical frequency to measure a property of the sample.

* * * * *

UNITED STATES PATENT AND TRADEMARK OFFICE
CERTIFICATE OF CORRECTION

PATENT NO. : 8,446,592 B1
APPLICATION NO. : 12/535509
DATED : May 21, 2013
INVENTOR(S) : Arissian et al.

It is certified that error appears in the above-identified patent and that said Letters Patent is hereby corrected as shown below:

In the Claims:

In Column 16, line 47, claim 11, Before "signal", delete "of the", therefor

In Column 16, line 52, claim 12, After "disposed", delete "to detect", therefor

Signed and Sealed this
Twentieth Day of August, 2013

Teresa Stanek Rea
*Acting Director of the United States Patent and Trademark Office*